US012749621B2

(12) United States Patent
Hongo

(10) Patent No.: US 12,749,621 B2
(45) Date of Patent: Sep. 29, 2026

(54) COIL MANUFACTURING APPARATUS, AND COIL MANUFACTURING METHOD

(71) Applicant: ASTER CO., LTD., Yokote (JP)

(72) Inventor: Takenobu Hongo, Fukushima (JP)

(73) Assignee: ASTER CO., LTD., Yokote (JP)

( * ) Notice: Subject to any disclaimer, the term of this patent is extended or adjusted under 35 U.S.C. 154(b) by 0 days.

(21) Appl. No.: 18/755,502

(22) Filed: Jun. 26, 2024

(65) Prior Publication Data

US 2024/0355541 A1 Oct. 24, 2024

Related U.S. Application Data

(63) Continuation of application No. 17/254,101, filed as application No. PCT/JP2019/027142 on Jul. 9, 2019, now Pat. No. 12,057,265.

(30) Foreign Application Priority Data

Jul. 17, 2018 (JP) ................................ 2018-133870
Jul. 17, 2018 (JP) ................................ 2018-133871

(51) Int. Cl.
*H01F 7/06* (2006.01)
*B23K 20/02* (2006.01)
(Continued)

(52) U.S. Cl.
CPC ........... *H01F 41/061* (2016.01); *B23K 20/02* (2013.01); *H02K 15/33* (2025.01); *B23K 2101/38* (2018.08)

(58) Field of Classification Search
CPC ... H01F 41/061; H01F 41/04; H02K 15/0414; H02K 3/02; H02K 3/18; H02K 15/0068;
(Continued)

(56) References Cited

U.S. PATENT DOCUMENTS 4,779,812 A 10/1988 Fisher et al.
5,022,138 A * 6/1991 Tanaka .................. H01R 43/28
29/753

(Continued)

FOREIGN PATENT DOCUMENTS

CN 104365003 A 2/2015
CN 106849553 A 6/2017

(Continued)

OTHER PUBLICATIONS

Notice of Reasons for Refusal dated Aug. 29, 2024, directed to JP Application No. 2023-176019; 9 pages.

(Continued)

*Primary Examiner* — Paul D Kim
(74) *Attorney, Agent, or Firm* — Morrison & Foerster LLP

(57) ABSTRACT

The coil manufacturing apparatus includes: a bending device configured to bend each of a plurality of flat conductors; and a welding device configured to weld the plurality of flat conductors. The bending device is a unit configured to bend each of the flat conductors before being supplied to the welding device. The welding device includes a first holding portion and a second holding portion disposed facing each other, and a driving portion configured to move the first holding portion and the second holding portion. The helical structure body is formed by pressing end faces of the one flat conductor and the another flat conductor against each other along a strip longitudinal direction and joining the flat conductors through pressure welding while reducing a distance in the strip longitudinal direction. The coil manufacturing apparatus includes a removing device configured to remove an unwanted portion of the flat conductors generated by welding.

5 Claims, 19 Drawing Sheets

(51) Int. Cl.

| | |
|---|---|
| ***H01F 41/061*** | (2016.01) |
| ***H02K 15/33*** | (2025.01) |
| *B23K 101/38* | (2006.01) |

(58) Field of Classification Search

CPC . H02K 15/0081; B23K 20/02; B23K 2101/38

See application file for complete search history.

(56) References Cited

U.S. PATENT DOCUMENTS

| | | | | |
|---|---|---|---|---|
| 8,416,044 | B2 | 4/2013 | Saka et al. | |
| 9,712,024 | B2 | 7/2017 | Kurashige et al. | |
| 10,211,710 | B2 | 2/2019 | Hongo | |
| 10,637,336 | B2 | 4/2020 | Hirao | |
| 10,742,097 | B2 | 8/2020 | Hongo | |
| 12,057,265 | B2 | 8/2024 | Hongo | |
| 2010/0123541 | A1 | 5/2010 | Saka et al. | |
| 2014/0265711 | A1* | 9/2014 | Koshino | H02K 3/28 310/198 |
| 2014/0347155 | A1* | 11/2014 | Nomura | H01F 27/2847 336/173 |
| 2015/0171716 | A1 | 6/2015 | Kurashige et al. | |
| 2016/0315525 | A1 | 10/2016 | Hongo | |
| 2016/0344269 | A1 | 11/2016 | Yabe et al. | |
| 2016/0380500 | A1 | 12/2016 | Oka et al. | |
| 2017/0117782 | A1 | 4/2017 | Hirao | |
| 2019/0006921 | A1 | 1/2019 | Hongo | |
| 2020/0287446 | A1 | 9/2020 | Hongo | |
| 2022/0337135 | A1 | 10/2022 | Hongo | |
| 2022/0352792 | A1 | 11/2022 | Hongo | |

FOREIGN PATENT DOCUMENTS

| | | | |
|---|---|---|---|
| DE | 102017100862 | A1 | 7/2017 |
| JP | S58-123708 | A | 7/1983 |
| JP | S60-176443 | A | 9/1985 |
| JP | S62-40041 | A | 2/1987 |
| JP | 2002-369428 | A | 12/2002 |
| JP | 2005-51846 | A | 2/2005 |
| JP | 2006-50853 | A | 2/2006 |
| JP | 2008-228434 | A | 9/2008 |
| JP | 2010-62488 | A | 3/2010 |
| JP | 2010-118574 | A | 5/2010 |
| JP | 2010-192167 | A | 9/2010 |
| JP | 2010-251615 | A | 11/2010 |
| JP | 5592554 | B1 | 8/2014 |
| JP | 2015-135955 | A | 7/2015 |
| JP | 2017-216407 | A | 12/2017 |
| JP | 2018-51630 | A | 4/2018 |
| JP | 2020-014298 | A | 1/2020 |
| JP | 2020-14299 | A | 1/2020 |
| TW | 201212061 | A1 | 3/2012 |
| WO | 2020/017394 | A1 | 1/2020 |

OTHER PUBLICATIONS

Notice of Reasons for Refusal dated Jan. 24, 2025, directed to JP Application No. 2023-176019; 10 pages.

Hongo, U.S. Office Action mailed Sep. 28, 2023, directed to U.S. Appl. No. 17/254,101; 11 pages.

International Search Report and Written Opinion dated Oct. 15, 2019, directed to PCT/JP2019/027142; 18 pages.

Notice of First Review Opinion dated Mar. 15, 2023, directed to CN Application No. 201980041350.3; 17 pages.

Supplementary European Search Report dated Mar. 9, 2022, directed to EP Application No. 19838312.7; 4 pages.

First Office Action dated Jul. 8, 2026, directed to CN Application No. 202311445888.5; 15 pages.

* cited by examiner (A)

(B)

(A)

(B)

LB1 < LMAX × 30% → 2 × LB2 ≧ LMAX × 40%

LB1 ≦ LB2 → 2 × LB2 ≧ LMAX × 50%

(A)

(B)

COIL MANUFACTURING APPARATUS, AND COIL MANUFACTURING METHOD

CROSS-REFERENCE TO RELATED APPLICATIONS

This application is a continuation of U.S. application Ser. No. 17/254,101, filed Dec. 18, 2020, now U.S. Pat. No. 12,057,265, which is a U.S. national stage application under 35 U.S.C. § 371 of International Application No. PCT/JP2019/027142, filed Jul. 9, 2019, which claims priority to Japanese Patent Application Nos. 2018-133870 and 2018-133871, filed Jul. 17, 2018. The entire contents of each priority application is incorporated herein by reference.

FIELD OF THE DISCLOSURE

The present invention relates to a coil manufacturing apparatus, a coil manufacturing system, a coil manufacturing method, and a coil, configured such that flat plates are welded through pressurization and deformation.

BACKGROUND OF THE DISCLOSURE

A stator, which is a component member of a motor, has a coil provided around a core (stator core). To achieve a low loss and smaller motor, it is important to enhance the space factor of the coil in the core.

A coil having an enhanced space factor in the core and a manufacturing apparatus thereof have been known (see, for example, Patent Literature 1). The coil is formed by preparing flat conductors punched into a U shape (a shape of Japanese katakana "ko"), welding the end faces of the flat conductors to each other through cold pressure welding to form a region for one turn of the coil, and continuously joining the formed regions for one turn into a helical form.

According to the technique disclosed in Patent Literature 1, it is possible to provide a good-quality coil having an enhanced space factor in a core and enhanced heat dissipation performance and free from deterioration in property caused by cutting and welding.

PATENT LITERATURE

Patent Literature 1: Japanese Patent No. 5592554

SUMMARY OF THE DISCLOSURE

However, in the aforementioned coil manufacturing apparatus, it cannot be said that sufficient examination has been made about a technique for mass-production of good-quality coils. Therefore, there is room for improvement in terms of the enhancement of productivity.

It is an object of the present invention to provide a coil manufacturing apparatus, a coil manufacturing system, a coil manufacturing method, and a coil manufactured thereby, the coil manufacturing apparatus, system and method enabling mass-production of good-quality coils that have an enhanced space factor in a core and enhanced heat dissipation performance and that are free from deterioration in property caused by cutting and welding.

The present invention solves the above-described problem by the following means.

An aspect of the present invention is a coil manufacturing apparatus configured to form a helical structure body by joining a plurality of flat conductors. The apparatus includes: a bending device configured to bend each of the plurality of flat conductors; and a welding device configured to weld the plurality of flat conductors. The bending device is a unit configured to bend each of the flat conductors before being supplied to the welding device such that one portion, of each of the plurality of flat conductors, extending along a helical traveling direction is inclined with respect to the other portion. The welding device includes a first holding portion and a second holding portion disposed facing each other, the first holding portion being capable of pinching one of the flat conductors, the second holding portion being capable of pinching another one of the flat conductors, and a driving portion configured to move the first holding portion and the second holding portion. The welding device is a unit configured to form the helical structure body by pressing end faces of the one flat conductor and the another flat conductor against each other along a strip longitudinal direction and joining the flat conductors through pressure welding while reducing a distance in the strip longitudinal direction.

Further another aspect of the present invention is a coil manufacturing system, including the plurality of coil manufacturing apparatuses.

Further another aspect of the present invention is a coil manufacturing method for forming a helical structure body by joining a plurality of flat conductors. The method includes: a bending step of bending each of the flat conductors such that one portion, of each of the plurality of flat conductors, extending along a helical traveling direction is inclined with respect to the other portion; and a welding step of forming the helical structure body by pressing end faces of one and another one of the bent flat conductors against each other along a strip longitudinal direction and joining the flat conductors through pressure welding while reducing a distance in the strip longitudinal direction.

Further another aspect of the present invention is a coil constituted of a helical structure body that is formed by continuously joining strip-shaped flat conductors in a helical shape. A region for one turn of the helical structure body includes two sides facing each other, one side being bent so as to be inclined with respect to the other side.

Further another aspect of the present invention is a coil manufacturing apparatus configured to form a helical structure body by joining a plurality of flat conductors. The apparatus includes: a welding device configured to weld the plurality of flat conductors; and a removing device configured to remove a portion of the welded flat conductors. The welding device includes a first holding portion and a second holding portion disposed facing each other, the first holding portion being capable of pinching one of the flat conductors, the second holding portion being capable of pinching another one of the flat conductors, and a driving portion configured to move the first holding portion and the second holding portion. The welding device is a unit configured to form the helical structure body by pressing end faces of the one flat conductor and the another flat conductor along a strip longitudinal direction and joining the flat conductors through pressure welding while reducing a distance in the strip longitudinal direction. The removing device is a unit configured to remove an unwanted portion of the flat conductors generated by welding.

Further another aspect of the present invention is a coil manufacturing system, including the plurality of coil manufacturing apparatuses.

Further another aspect of the present invention is a coil manufacturing method for forming a helical structure body by joining a plurality of flat conductors. The method includes: a welding step of forming the helical structure body by pressing end faces of one and another one of the plurality of flat conductors against each other along a strip longitudinal direction and joining the conductors through pressure welding while reducing a distance in the strip longitudinal direction; and a removing step of removing a portion of the welded flat conductors.

The present invention can provide a coil manufacturing apparatus, a coil manufacturing system, a coil manufacturing method, and a coil manufactured thereby, the coil manufacturing apparatus, system and method enabling mass-production of good-quality coils that have an enhanced space factor in a core and enhanced heat dissipation performance and that are free from deterioration in property caused by cutting and welding.

BRIEF DESCRIPTION OF THE FIGURES

FIGS. 2(A) to 2(G) include diagrams illustrating coil pieces according to the present embodiment, in which FIGS. 2(A) and 2(B) are top views, FIG. 2(C) is a cross-sectional view, and FIGS. 2(D) to 2(G) are top views.

FIGS. 3(A) and 3(B) include diagrams illustrating a bending device according to the present embodiment, in which FIG. 3(A) is a top view of the coil pieces, and FIG. 3(B) is a schematic diagram of the bending device.

FIGS. 10(A) to 10(D) include diagrams illustrating a partially extracted portion of the welding device according to the present embodiment, in which FIG. 10(A) is a top view, FIG. 10(B) is a front view, FIG. 10(C) is a top view, and FIG. 10(D) is a front view.

FIGS. 12(A) to 12(E) include diagrams illustrating the outline of a removing device according to the present embodiment, in which FIG. 12(A) is a top view, and FIGS. 12(B) to 12(E) are front views.

FIGS. 14(A) to 14(E) include diagrams illustrating an example of coil molding according to the present embodiment, in which FIG. 14(A) is a top view, and FIGS. 14(B) to 14(E) are side views.

FIGS. 19(A) to 19(C) includes diagrams illustrating a method of attaching a coil according to the present embodiment to a stator core, in which FIG. 19(A) is a side view, and FIGS. 19(B) and 19(C) are top views.

DETAILED DESCRIPTION OF THE DISCLOSURE

Hereinafter, embodiments of the present invention will be described in detail with reference to the drawings.

Figure 1:
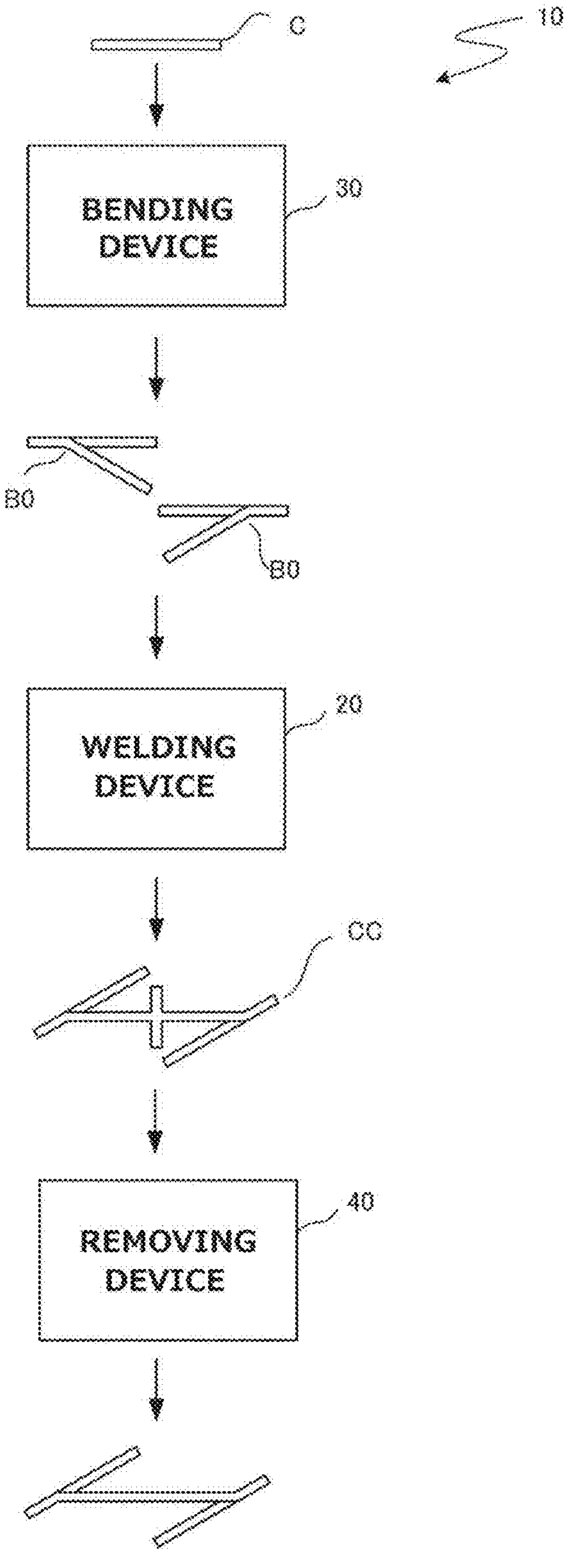
FIG. 1 is a diagram illustrating an outline of a coil manufacturing apparatus according to an embodiment of the present invention.

FIG. 1 is an appearance view schematically showing the configuration of a coil manufacturing apparatus 10 according to the present embodiment.

The coil manufacturing apparatus 10 of the present embodiment is configured to form a coil as a helical structure body by joining a plurality of flat conductors C. The coil manufacturing apparatus 10 includes a bending unit (bending device) 30 configured to bend each of the plurality of flat conductors C to form a bent portion B0, a welding unit (welding device) 20 configured to weld the plurality of flat conductors C, and a removing unit (removing device) 40 configured to remove a portion of the welded flat conductors C.

The bending device 30 is provided on an upstream side of the welding device 20. Before the flat conductors C are supplied to the welding device 20, the bending device 30 forms the bent portion B0 for each of the flat conductors C by bending the flat conductors C such that one portion, of each of the flat conductors C, extending along a helical traveling direction, is inclined with respect to the other portion.

The welding device 20 is provided on a downstream side of the bending device 30. The welding device 20 presses end faces of one flat conductor C and another flat conductor C against each other along a strip longitudinal direction, forms a flat conductor welded product (welded coil piece) CC through cold pressure welding while reducing a distance in the strip longitudinal direction, and joins the thus formed welded products together to form a helical structure body.

The removing device 40 is a unit provided on a downstream side of the welding device 20 to remove burr generated by cold pressure welding between one flat conductor C and another flat conductor C.

These devices will be described below in detail.

Figure 2:
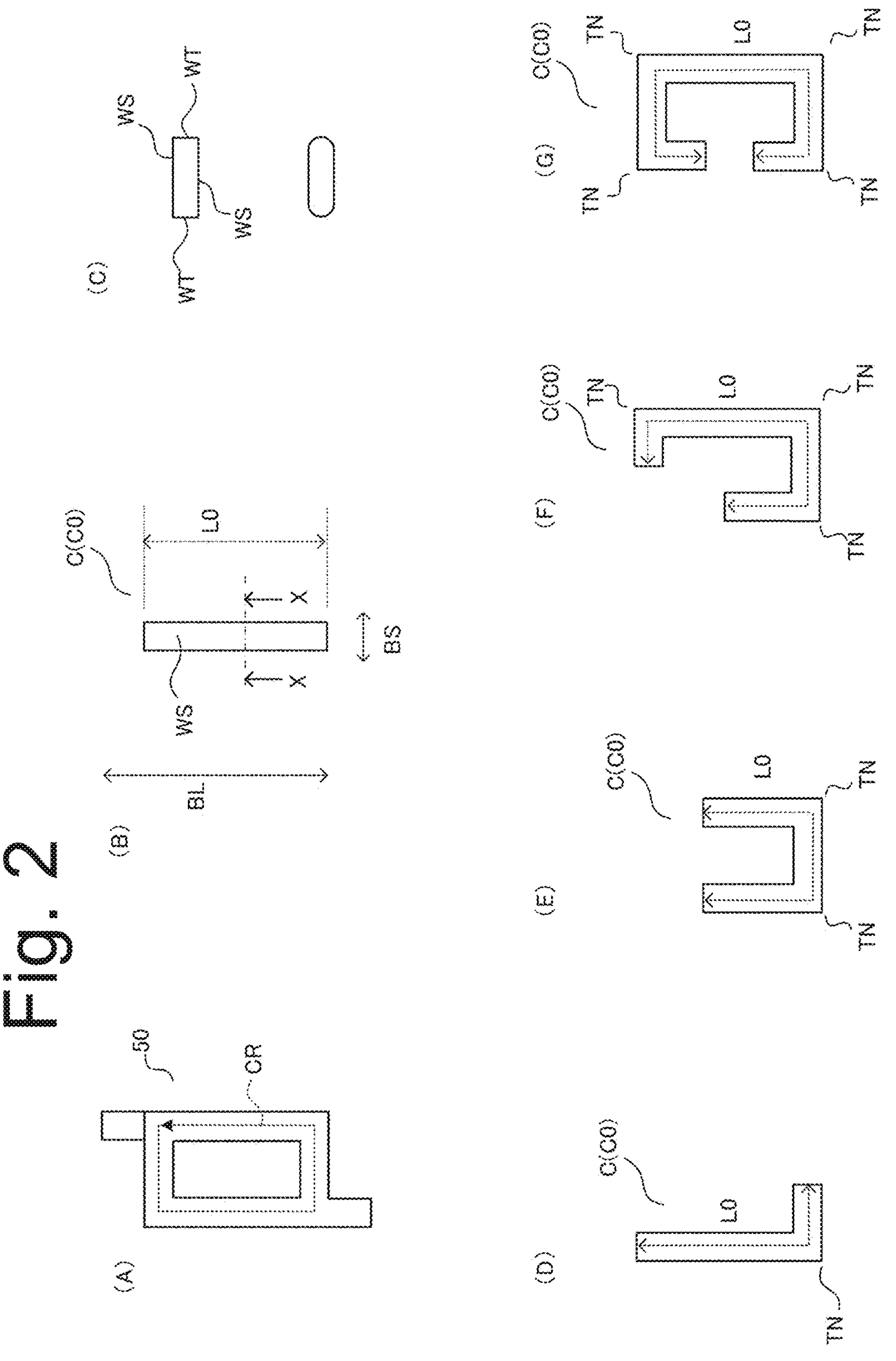

First, the flat conductors C used in the coil manufacturing apparatus 10 of the present embodiment will be described. FIG. 2 includes diagrams illustrating an example of the flat conductors C used in the coil manufacturing apparatus 10 of the present embodiment. FIG. 2(A) is a top view of a coil 50 in a completed state viewed from the axial direction of a helical structure. FIG. 2(B) is a top view of a flat conductor C. FIG. 2(C) is an enlarged cross sectional view of the flat conductor C along an X-X line of FIG. 2(B). FIGS. 2(D) to 2(G) are top views showing examples of the shape of the flat conductor C.

As shown in FIG. 2(A), the coil 50 of the present embodiment is constituted of a helical structure body formed by continuously welding a plurality of flat conductors C. A region corresponding to one turn of the helical structure (hereinafter referred to as a region CR for one turn) has a (substantially) rectangular shape. The flat conductors C constituting the coil 50 are also referred to as coil pieces C in the following description.

The flat conductors (the coil pieces) C of the present embodiment are strip-shaped (tape-shaped) conductors having a cross section, perpendicular to an axial direction, being formed into a planar shape as shown in FIGS. 2(B) and 2(C), as compared with a round wire conductor having a cross section formed into a substantially circular shape. More specifically, the coil pieces C are strip-shaped members long in a prescribed direction, having two wider surfaces WS facing each other and two narrower surfaces WT facing each other. The coil pieces C are conductors having a cross section (cross section along X-X line of FIG. 2(B)) perpendicular to a strip longitudinal direction BL being formed into a rectangular shape or a rectangular shape with rounded corners as shown in FIG. 2(C). In the following description, as an example of the flat conductor, a flat conductor having a (substantially) rectangular shape in cross section that is perpendicular to the strip longitudinal direction as shown in FIG. 2(C) will be described.

Specifically, each of the flat conductors (the coil pieces) C has a linear shape (FIG. 2(B)) having a length equal to or less than the length of the region CR for one turn of a helical structure body or a shape (FIGS. 2(D) to 2(G)) having at least one direction change portion TN. Here, the direction change portion TN is a region bent to change the extending direction of the strip longitudinal direction.

In the case of the flat conductors (the coil pieces) C having the direction change portions TN as shown in FIGS. 2(D) to 2(G), the respective direction change portions TN are bent in an identical direction (constantly in the right or left direction) along the strip longitudinal direction so as to make a helical form when the flat conductors are continuously joined. In the case of the coil pieces C having the direction change portions TN, at least one (preferably all) of the direction change portions TN desirably has a shape that is not a curve (for example, a substantially rectangular shape).

In the following description, the coil pieces C also include a helical structure body that is formed by continuously joining (connecting) a plurality of coil pieces (flat conductors) C but is not yet completed as a coil (a helical structure body in a completed state) 50 (a helical structure body scheduled to have yet another or other coil pieces C connected thereto). In other words, in the following description, the coil pieces C include coil pieces (unconnected coil pieces) of a minimum unit having a linear shape or having the direction change portions TN in an identical direction in the strip longitudinal direction, and coil pieces having a helical structure formed by connecting the plurality of coil pieces of the minimum unit, the helical structure being longer than the region CR for one turn of a coil (a helical structure body scheduled to be completed). When these coil pieces need to be distinguished for the convenience of description, the coil pieces of a minimum unit are referred to as unit coil pieces C0 (C01, C02, C03 . . . C0N), welded products of coil pieces formed by connecting a plurality of unit coil pieces C0, that is, the welded products not yet finished as the coils (helical structure bodies scheduled to be completed) 50 are referred to as welded coil pieces CC (CC1, CC2, . . . , CCN), and helical structure bodies scheduled to be completed (in the completed state) are referred to as the coils 50.

In an example, the coil pieces C (unit coil pieces C0) are configured to have a linear shape or a substantially right angle (non-curved) direction change portion (corner portion) TN by a punching process of a copper plate (for example, plate-like oxygen-free copper having a thickness of, for example, 0.1 mm to 5 mm (high purity copper containing no oxides and having the purity of 99.95% or more)) or the like. More specifically, when the wider surface WS is viewed from the top, the shape of the unit coil pieces C0 includes a linear shape (I shape) without any direction change portion TN (FIG. 2(B)), an L shape having one direction change portion TN (FIG. 2(D)), a U shape (a shape of Japanese katakana "ko") having two direction change portions TN (FIG. 2(E)), a substantially C shape having three direction change portions TN (FIG. 2(F)), and a C shape having four direction change portions TN (FIG. 2(G)). In the following description, the coil pieces C0 may be described to have a U shape, a (substantially) C shape, and a substantially O shape. In any case, the direction change portions TN (corner portions) are all in a substantially rectangular shape.

The coil pieces C (the unit coil pieces C0 and/or a welded coil piece CC) are set such that a preparation length L0 as a total distance in the strip longitudinal direction is longer by a margin portion than a completion length in a spiral longitudinal direction of the helical structure body (coil) 50 scheduled to be completed. The margin portion is set to a total reduction distance that is a distance reduced by pressing when all the coil pieces C are cold pressure-welded. The preparation length L0, the completion length, the margin portion, and the total reduction distance will be described in detail in the description of a coil manufacturing method described later.

In the following examples, a description will be given of the case where the coil 50 is manufactured using the U-shaped (Japanese katakana "ko"-shaped) flat conductors (the coil pieces) C shown in FIG. 2(E). However, the coil pieces C may have any one of the shapes shown in FIG. 2, or may have a combination of the plurality of shapes shown in FIG. 2.

Figure 3:
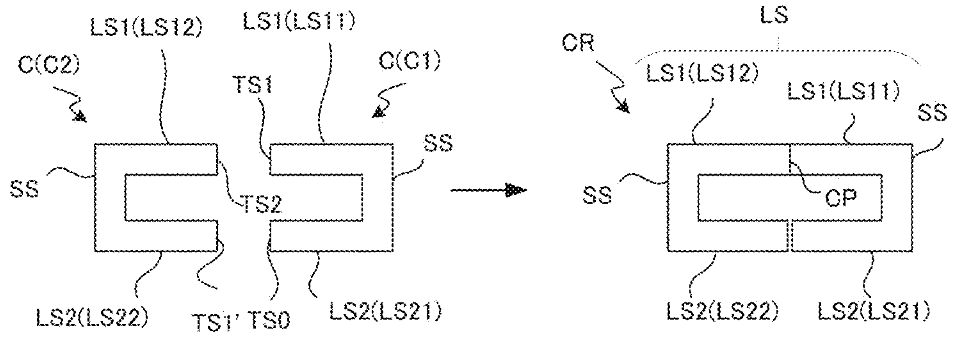
Figure 3:
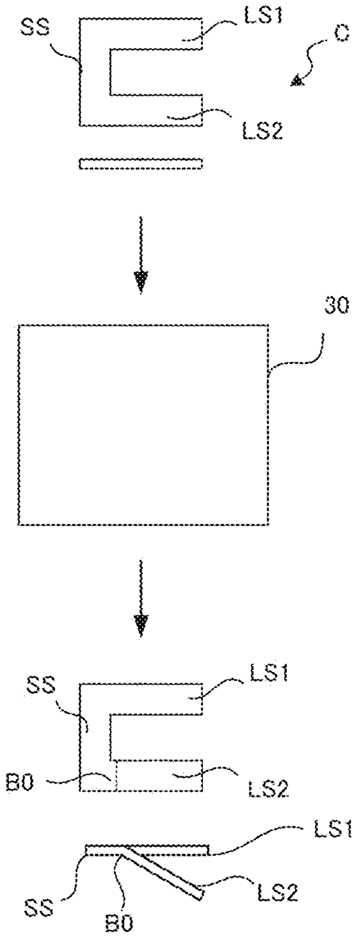
Figure 4:
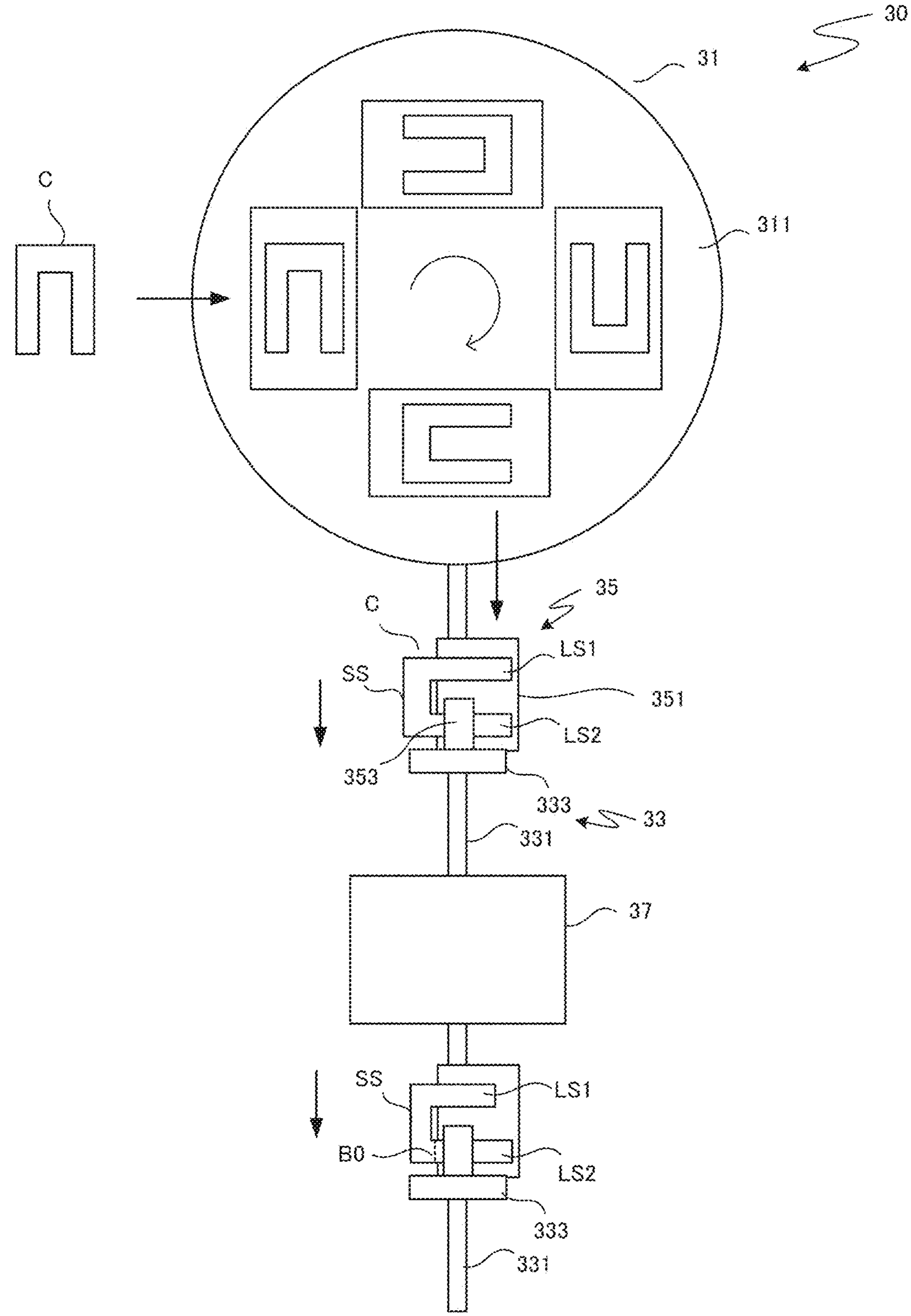
FIG. 4 is a top view showing the outline of the bending device according to the present embodiment.
Figure 5:
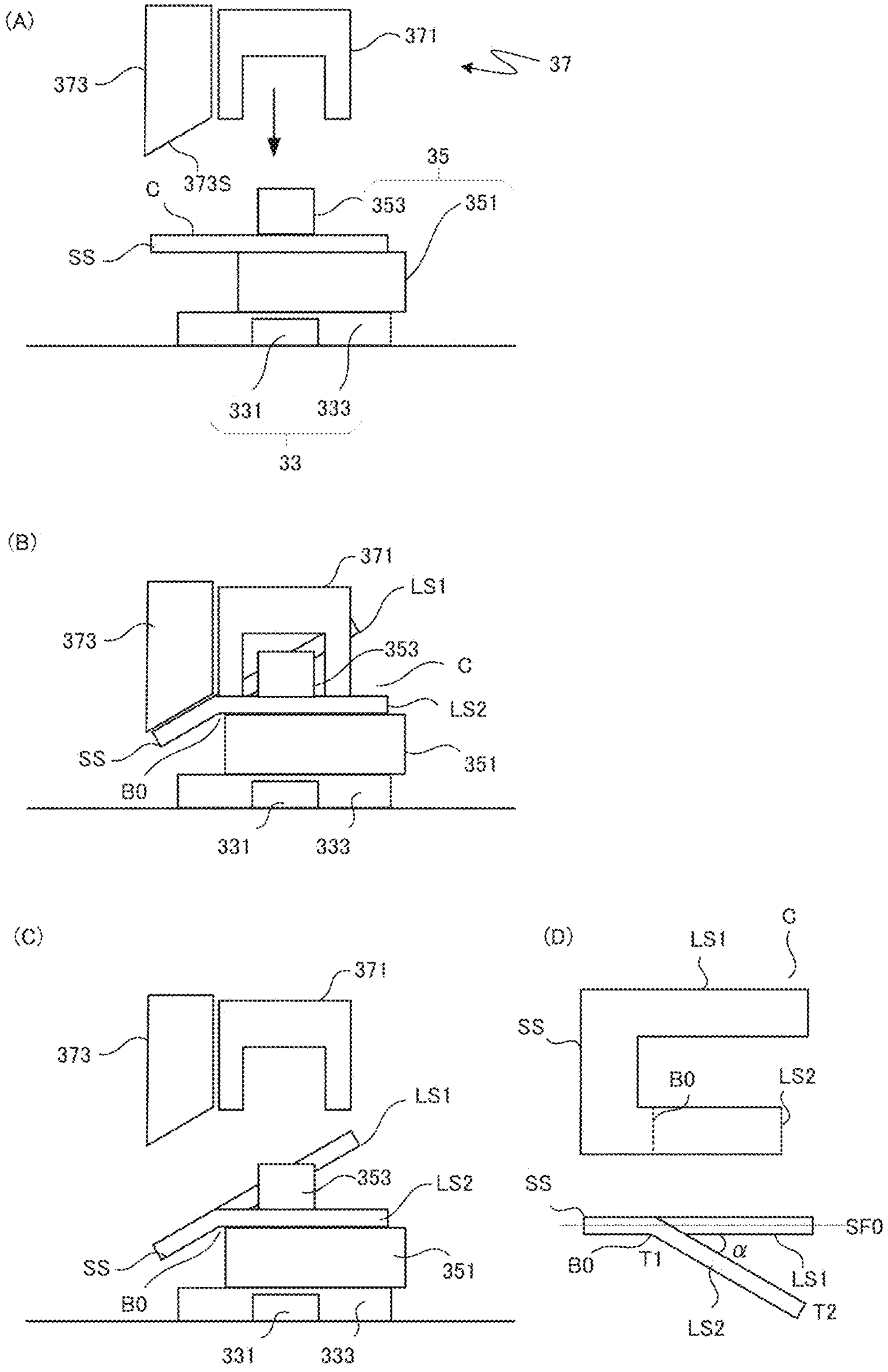
FIGS. 5(A) to 5(D) include front views showing the states of deformation by the bending device according to the present embodiment.
Figure 6:
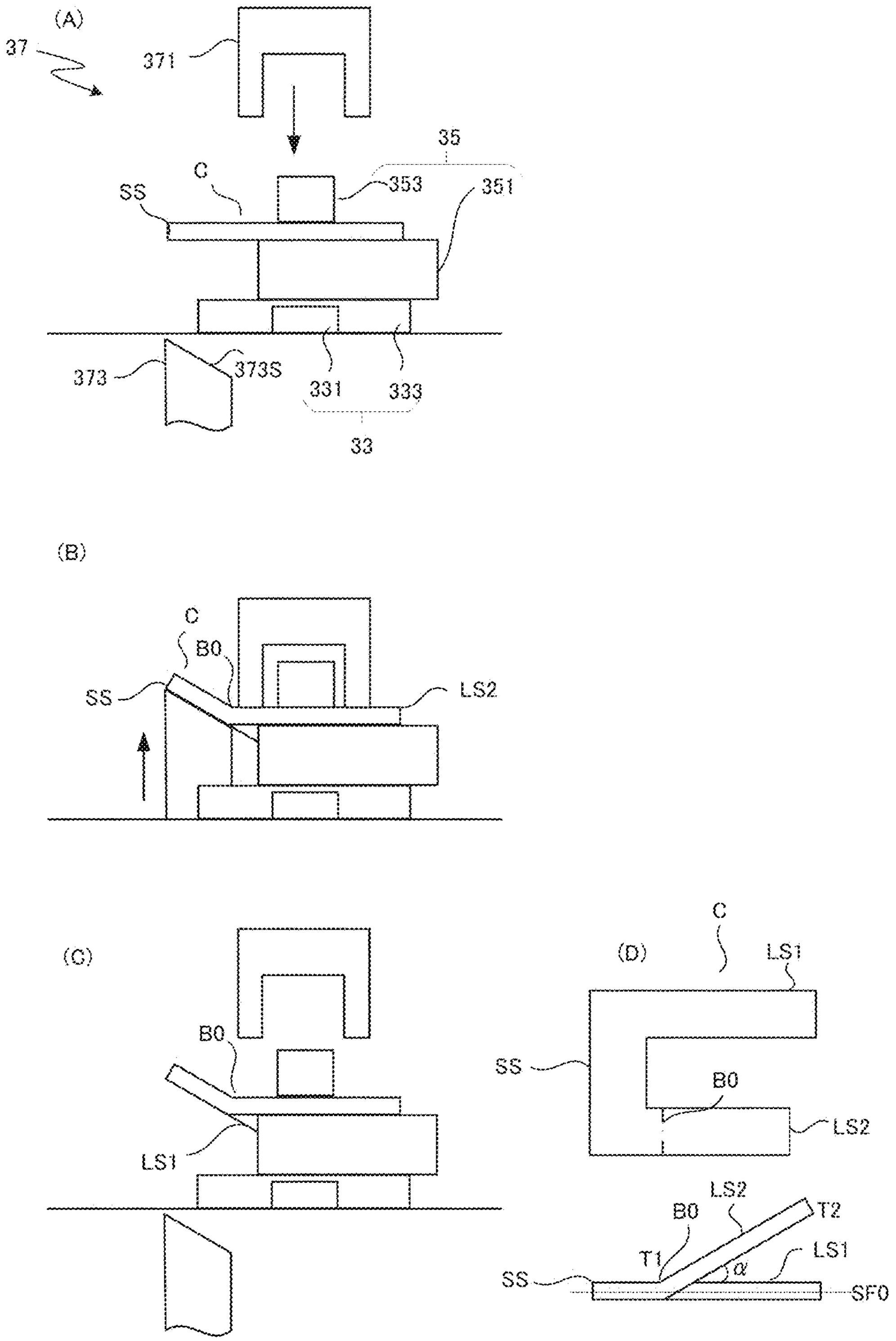
FIGS. 6(A) to 6(D) include front views showing the states of deformation by the bending device according to the present embodiment.

The bending device 30 of the present embodiment will be described with reference to FIGS. 3 to 6. FIG. 3 includes schematic diagrams of the bending device 30 of the present embodiment, in which FIG. 3(A) is a top view showing the coil pieces C before deformation, which are supplied to the bending device 30, and FIG. 3(B) is a schematic diagram of the bending device 30. In an upper row of FIG. 3(B), the top view and the side view of the coil piece C before deformation are drawn together. In a lower row of FIG. 3(B), the top view and the side view of the coil piece C, deformed in the bending device 30 shown in a middle row, are drawn together. FIG. 4 is a top view showing the outline of the bending device 30. FIGS. 5 and 6 are front views showing the outlined configuration of a portion (the deforming portion 37) of the bending device 30 and the steps of bending.

As described later in detail in <Coil Manufacturing Method>, coil pieces C1 and C2 are pressure-welded by the welding device 20, so that a distance therebetween is reduced in actuality. However, since the deformation caused by the bending device 30 is mainly described herein, reduction in distance caused by pressure welding (change in length of the longer side LS between the state of the coil pieces only in contact with each other and the state after welding) is not mentioned. Also in the following description of the coil manufacturing apparatus 10 with reference to FIGS. 3 to 14, the change in length caused by pressure welding is also omitted.

First, with reference to FIG. 3(A), as an example of the present embodiment, two coil pieces C (C1, C2) having a substantially identical U-shape shown in FIG. 3(A) are used.

One end face TS1 of the coil piece C1 and one end face TS2 of the coil piece C2 are butted to form a welded portion CP. Hence, a (substantially) rectangular region CR for one turn having longer sides LS and shorter sides SS is configured. Here, although the coil pieces C are stated as the coil pieces C1 and C2 for the sake of convenience, they are the coil pieces C having a (substantially) identical shape, and their front and back are reversed about the end faces TS1 and TS2.

The coil 50 is formed by continuously joining a predetermined number of the regions CR for one turn. Accordingly, since the other end face TS0 is not welded to the other end face TS1', and therefore the region CR for one turn in this state is discontinuous in, for example, an opposite position of the welded portion CP. For example, when the coil pieces C1 and C2 shown in FIG. 3(A) are the first two pieces, the end face TS0 of the coil piece C1 is connected to, for example, another coil piece (not shown) constituting a terminal or the like, and is guided to the outside. The end face TS1' of the coil piece C2 is welded with the end face of a next coil piece (not shown).

More specifically, in this case, one longer side LS (upper side of FIG. 3(A)) of the region CR for one turn is constituted of a longer side region LS1 (LS11) of the coil piece C1 and a longer side region LS1 (LS12) of the coil piece C2. The other longer side LS (lower side of FIG. 3(A)) of the region CR for one turn is constituted of a longer side region LS2 (LS22) of the coil piece C2 and a longer side region of a different (next) coil piece (not shown) having an identical shape.

As shown in FIG. 3(B), the bending device 30 of the present embodiment is a device that forms a bent portion B0 by bending a portion of the supplied coil piece C (upper row of FIG. 3(B)) before deformation as shown in the lower row of FIG. 3(B). The coil piece C before deformation is a plate-shaped coil piece C punched from a plate, and is in the state where the entire region of the coil piece C is substantially coplanar without being intentionally deformed.

Specifically, as shown in FIG. 4, the bending device 30 includes, for example, a supply portion 31, a conveying portion 33, a supporter 35, and a deforming portion 37 of the coil pieces C. For example, the supply portion 31 is provided with a turntable 311, or the like, which can stock a plurality of (for example, four) coil pieces C before deformation. The supply portion 31 receives the coil pieces C before deformation from an upstream step.

The coil pieces C before deformation on the turntable 311 are supplied to the supporter 35 one piece at a time with rotation of the turntable 311.

The supporter 35 includes a support table 351 having a surface (upper surface) on which the coil piece C can be mounted, and a retaining portion 353 that retains a portion of the coil piece C mounted on the support table 351 from the upper side. The coil piece C before deformation is mounted on the support table 351, and a portion of the coil piece C is held between the support table 351 and the retaining portion 353 so as to be temporarily fixed.

More specifically, the supporter 35 holds the coil piece C so that a portion thereof projects from the support table 351 (in the state where the support table 351 is not present directly below the coil piece C), for example.

For example, in the case of the U-shaped coil piece C, the coil piece C is held so that only one longer side region LS2 is pinched between the support table 351 and the retaining portion 353 and that the shorter side SS horizontally projects from the support table 351 (in the state where the support table 351 is not present directly below the coil piece C). The other longer side region LS1 may be mounted on the support table 351. Since the other longer side region LS1 is not retained by the retaining portion 353 (not pinched between the support table 351 and the retaining portion 353), the other longer side region LS1 is allowed to change its posture.

The conveying portion 33 includes, for example, a rail member 331, and a driving portion 333 that horizontally moves the supporter 35 along the rail member 331, for example. The conveying portion 33 stops the supporter 35 once in a prescribed pressing position in the deforming portion 37.

The deforming portion 37 is configured to be movable (in this example, movable in vertical ascending and descending directions) so as to be proximate to or separated from the supporter 35.

The deforming portion 37 will be described with reference to FIGS. 5 and 6. FIGS. 5 and 6 show the deforming portion 37 and the steps of bending the coil pieces C by the deforming portion 37 in time series. FIGS. 5(A) to 5(C) are front views (viewed from the lower side of FIG. 4). FIG. 5(D) shows the coil piece C after deformation shown in FIGS. 5(B) and 5(C). In FIG. 5(D), an upper view is a top view, and a lower view is a side view (a front view for the deforming portion 37).

FIGS. 6(A) to 6(C) are front views (viewed from the lower side of FIG. 4). FIG. 6(D) shows the coil piece C after deformation shown in FIGS. 6(B) and 6(C). In FIG. 6(D), an upper view is a top view, and a lower view is a side view (a front view for the deforming portion 37).

With reference to FIG. 5, the deforming portion 37 includes a pinching portion 371 and a biasing portion 373. The deforming portion 37 (the pinching portion 371 and the biasing portion 373) is capable of performing ascent and descent operation in this example so that the deforming portion 37 is proximate to and separated from the supporter 35. The biasing portion 373 has an inclined surface 373S that is inclined with respect to the face of the support table 351 (FIG. 5(A)).

When the pinching portion 371 descends, the pinching portion 371 comes into contact with a portion of the upper surface of the coil piece C held by the supporter 35, and pinches the coil piece C with the support table 351. The biasing portion 373 is positioned, for example, on the lateral side of the pinching portion 371. When the biasing portion 373 descends, the inclined surface 373S comes into contact with a portion (for example, the shorter side SS) of the coil piece C horizontally projecting from the support table 351. Hence, in this example, the coil piece C is bent downward to form a bent portion B0 (FIG. 5(B)). In this example, the surface of the coil piece C which comes into contact with the deforming portion 37 (the pinching portion 371 and the biasing portion 373) is mountain-folded at the bent portion B0.

The pinching portion 371 and the biasing portion 373 may perform ascent and descent operation at the same timing, or may perform the ascent and descent operation at different timing. When the pinching portion 371 and the biasing portion 373 perform the ascent and descent operation at different timing, the pinching portion 371 first descends to retain the coil piece C, and then the biasing portion 373 descends to bend the coil piece C at least in the case of descending.

At the time, the supporter 35 (retaining portion 353) retains only one longer side region LS2 of the coil piece C. The other longer side region LS1 of the coil piece C is not retained by the retaining portion 353 (see FIG. 4). Hence, when the shorter side SS is bent downward by the biasing portion 373, the longer side region LS1 continuing to the shorter side SS changes its posture so as to incline with respect to the other longer side region LS2 (FIG. 5(B)).

After deformation, as shown in FIG. 5(C), the pinching portion 371 and the biasing portion 373 ascend, and the deformed coil piece C is discharged from the deforming portion 37 by the conveying portion 33 (FIG. 4).

With the deformation, as specifically shown in FIG. 5(D), one longer side region LS1 and one shorter side SS of the coil piece C are positioned in a substantially identical plane (hereinafter referred to as reference plane SF0). When the reference plane SF0 is held horizontally, the other longer side region LS2 is bent so as to incline with respect to the reference plane SF0 with the bent portion B0 as a boundary. More specifically, the bending device 30 bends the coil piece C at the position of the bent portion B0 (shown by a broken line in FIG. 5(D)) so that the other longer side region LS2 is positioned such that an end portion T2 (that is on the side separating from the shorter side SS), rather than other end portion T1 closer to the shorter side SS, is below (or above) the reference plane SF0, i.e., the reference plane SF0 (one longer side region LS1) and the other longer side region LS2 form an angle α.

Thus, the bending device 30 of the present embodiment bends the coil piece C so that one side, out of two facing sides on the longer side of the coil piece C (the longer side regions LS1, LS2), which are scheduled to constitute a region CR for one turn of the coil 50, is inclined with respect to the other side.

The longer side region LS1 and the other longer side region LS2 in the above-described example are different in name only for the convenience of description. In other words, the longer side regions LS1 and LS2 can be exchanged. In that case, the deforming portion 37 may deform the coil piece C so that one longer side region LS1 and the other longer side region LS2 form the prescribed angle α.

FIG. 6 shows another example of the deforming portion 37. In the case of the deforming portion 37 shown in FIG. 5, the biasing portion 373 is positioned on the lateral side of the pinching portion 371, and ascends and descends in the same direction as the pinching portion 371. However, without being limited thereto, as shown in FIG. 6, the biasing portion 373 may be provided on the lateral side of the support table 351 (rail member 331) in an ascendable and descendable manner in a direction opposite to the movement of the pinching portion 371 so as to project from and retract to the support table 351. In this case, while the support table 351 is horizontally moving, the biasing portion 373 is retracted below the support table 351 (FIG. 6(A)). When the support table 351 moves to a pressing position of the deforming portion 37, stops once, and then the pinching portion 371 descends and pinches the coil piece C (after the pinching portion 371 pinches the coil piece C), the biasing portion 373 projects above the support table 351 (in a vertical direction). Consequently, the inclined surface 373S comes into contact with the shorter side SS of the coil piece C horizontally projecting from the support table 351, so that the coil piece C is bent, for example, upward to form the bent portion B0 (FIG. 6(B)). In this example, the surface of the coil piece C which comes into contact with the pinching portion 371 is valley folded at the bent portion B0.

After deformation, as shown in FIG. 6(C), the pinching portion 371 ascends, and the biasing portion 373 descends below the support table 351. The deformed coil piece C is then discharged from the deforming portion 37 by the conveying portion 33 (FIG. 4).

As a consequence, as shown in FIG. 6(D) for example, one longer side region LS1 and one shorter side SS of the coil piece C are positioned in the reference plane SF0. When the reference plane SF0 is held horizontally, the other longer side region LS2 is bent so that the end portion T2 on the other side, rather than the end portion T1 closer to the shorter side SS, is positioned below (or above) the reference plane SF0, with the bent portion B0 as a boundary. In other words, the bending device 30 bends the coil piece C at the position of the bent portion B0 (shown by a chain line in FIG. 6(D)) so that the reference plane SF0 (the longer side region LS1) and the longer side region LS2 forms an angle α.

When deformation of one coil piece C (C1) is completed in this way, a robot or the like, which is not shown, takes out the coil piece C (C1) from the support table 351, and the coil piece C (C1) is transferred to a downstream step (welding device 20).

Then, a next coil piece C (C2) is similarly supplied onto the support table 351 for deformation.

The bending device 30 performs such a bending process for all the coil pieces C which constitute a helical structure body, except for the coil pieces C used as both the end portions (a starting end portion and a terminal end portion) of the coil 50. With this configuration, the welding device 20 in the downstream step can perform sufficient welding.

Figure 7:
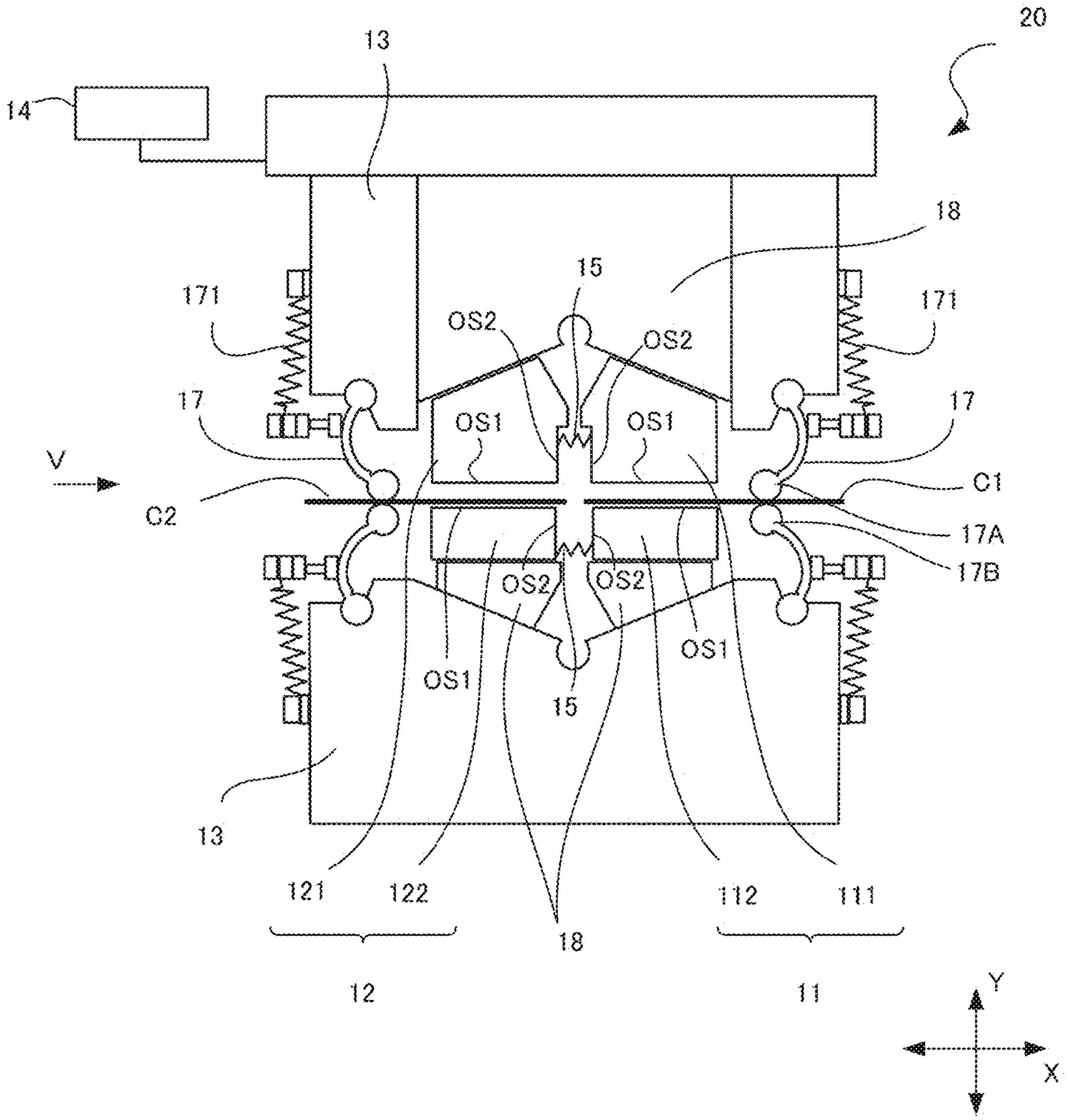
FIG. 7 is a front view showing a welding device according to the present embodiment.

Now, the welding device 20 will be described. FIG. 7 is a front view showing the outline of the welding device 20. The welding device 20 performs cold pressure welding between two flat conductors (the coil pieces) C (C1, C2). The welding device 20 includes a first holding portion 11 and a second holding portion 12 which can pinch the two flat conductors C (C1, C2), a driving portion 13 for moving the first holding portion 11 and the second holding portion 12, and a controller 14. The welding device 20 forms a helical structure body that is used as a coil 50 by joining a plurality of strip-shaped flat conductors (the coil pieces) C which can take a helical form when they are continuously joined.

The first holding portion 11 is movable along a first direction (a strip longitudinal direction of the flat conductor; X direction in FIG. 7), and is constituted of a first upper holder 111 and a first lower holder 112. The first upper holder 111 and the first lower holder 112 are disposed facing each other. The first upper holder 111 and the first lower holder 112 have facing faces OS1 along the first direction. In the present embodiment, for the convenience of description, the holder illustrated on the upper side is referred to as the first upper holder 111, and the holder illustrated on the lower side is referred to as the second lower holder 112. However, the terms upper and lower do not necessarily signify upper and lower positions in a vertical direction. More specifically, FIG. 7 may be the top view of the welding device 20. In that case, the first upper holder 111 may be, for example, a holder on a far side, and the first lower holder 112 may be, for example, a holder on a near side. The first upper holder 111 may be, for example, a left-side holder, and the first lower holder 112 may be, for example, a right-side holder.

The first upper holder 111 and the first lower holder 112 are movable along the X direction, and the facing faces OS1 extending along the X direction are movable along a second direction (a board thickness direction of the flat conductor; Y direction of FIG. 7) so as to come into contact with or separate from each other. The Y direction is a direction different from the X direction, such as a direction perpendicular to the X direction.

The second holding portion 12 has the same configuration as that of the first holding portion 11. The second holding portion 12 is disposed facing the first holding portion 11. The second holding portion 12 and the first holding portion 11 have facing faces OS2 along the second direction. Although a detailed description thereof is omitted, the second holding portion 12 is movable along the X direction. The second holding portion 12 is constituted of a second upper holder 121 and a second lower holder 122. The definition of the terms "upper and lower" in the first holding portion 11 also applies to the second upper holder 121 and the second lower holder 122.

The second upper holder 121 and the second lower holder 122 are movable along the X direction, and the facing faces OS1 are movable along the Y direction so as to come into contact with or separate from each other.

Figure 8:
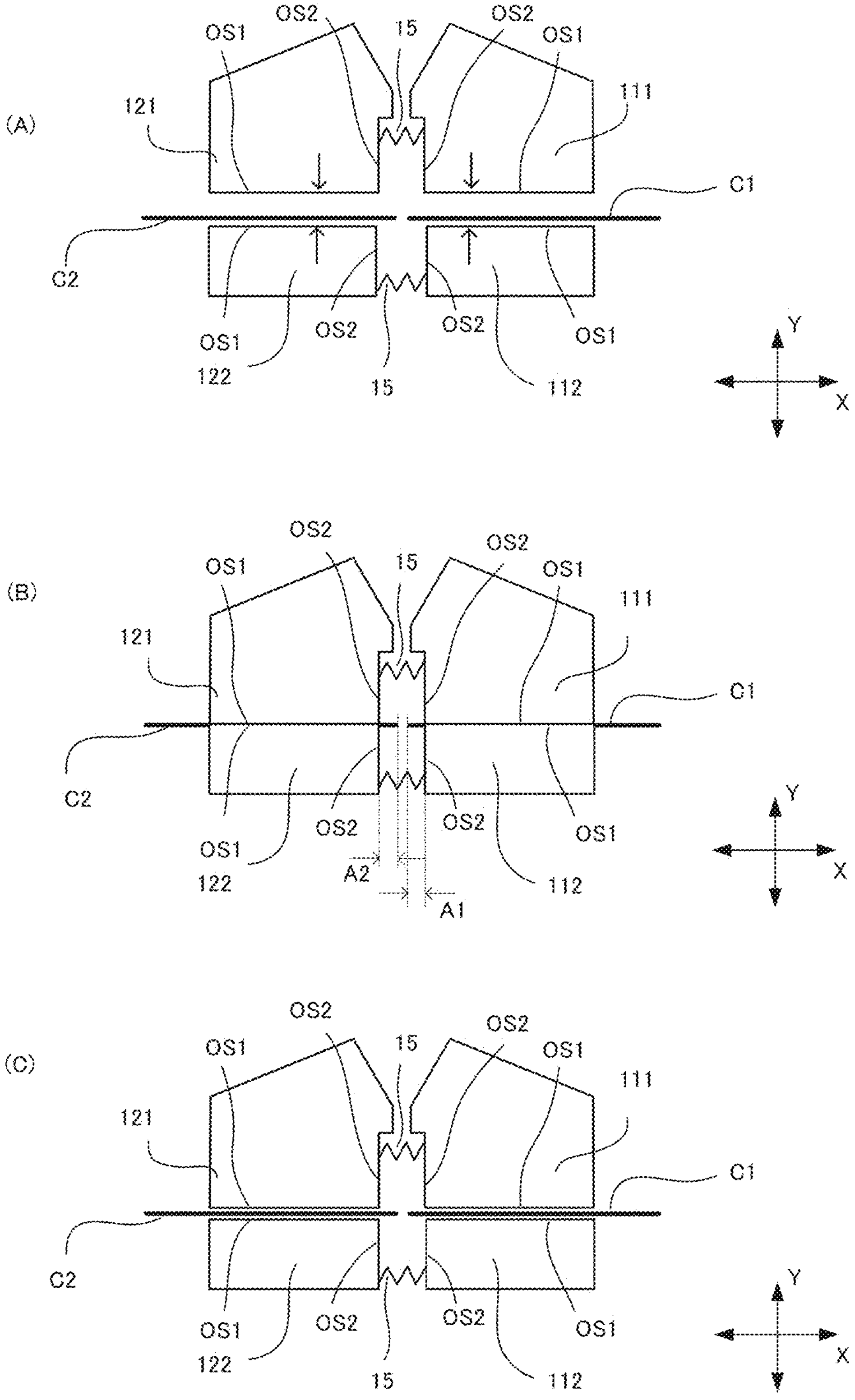
FIGS. 8(A) to 8(C) include front views showing a method of welding coil pieces by the welding device according to the present embodiment.
Figure 9:
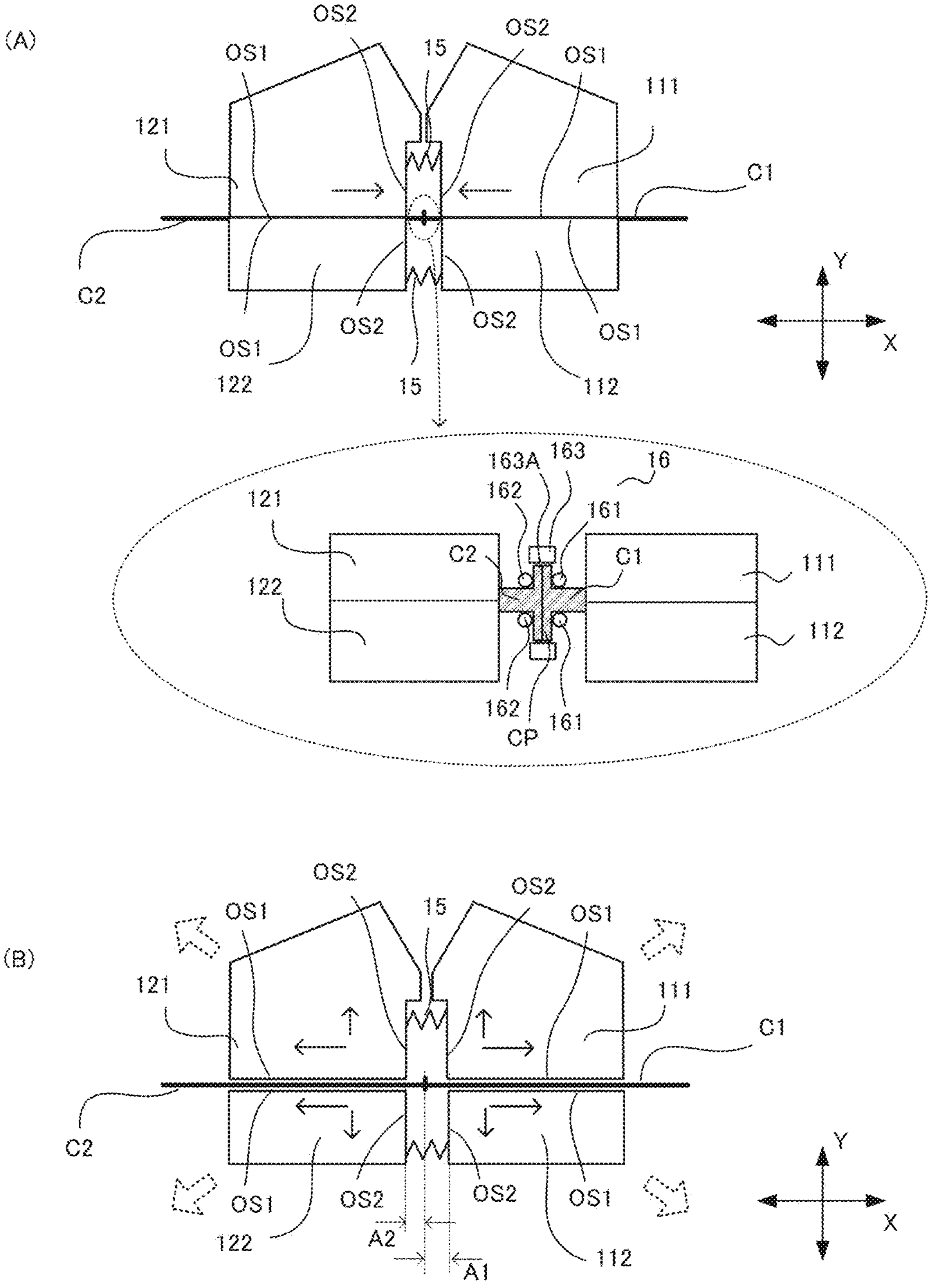
FIGS. 9(A) and 9(B) include front views showing a method of welding coil pieces by the welding device according to the present embodiment.

Although detailed illustration is omitted, in FIGS. 7 to 9, the first upper holder 111, the first lower holder 112, the second upper holder 121, and the second lower holder 122 are configured such that their top ends are substantially the portions (coil piece holding portions 111T, 112T, 121T, and 122T, see FIG. 10) to hold the coil pieces C. The coil piece holding portions 111T, 112T, 121T, and 122T are configured into, for example, a nail shape that is horizontally projecting from, for example, the first upper holder 111, the first lower holder 112, the second upper holder 121, and the second lower holder 122 so that only the vicinity of a pressure welded portion (joint portion) of the coil pieces C can locally be held (pinched). Therefore, operations described as the operations of the first upper holder 111, the first lower holder 112, the second upper holder 121, and the second lower holder 122 in FIGS. 7 to 9 are equivalent to the operations of the coil piece holding portions 111T, 112T, 121T, and 122T, and can be read as such.

The first holding portion 11 and the second holding portion 12 are biased by a biasing member (for example, a coiled spring) 15 in the direction separating from each other along the X direction. Although illustration is omitted, the first upper holder 111 and the first lower holder 112 are biased by a biasing member (for example, a coiled spring) in the direction separating from each other along the Y direction. The second upper holder 121 and the second lower holder 122 are biased by a biasing member (for example, a coiled spring) in the direction separating from each other along the Y direction.

The driving portion 13 moves the first holding portion 11 and the second holding portion 12 along the X direction and the Y direction through a drive transmitter (not shown) on the basis of an instruction from the controller 14.

On the outer side of the first holding portion 11 and the second holding portion 12 in the X direction, movement regulators 17 are provided to regulate movement of one flat conductor (the first coil piece C1 in FIGS. 7 to 9 for convenience) and the other flat conductor (the second coil piece C2 in FIGS. 7 to 9 for convenience) in a prescribed direction. The movement regulators 17 come into contact with both the surfaces of the first coil piece C1 (the second coil piece C2) to regulate movement in the Y direction. The movement regulators 17 bias both the coil pieces C1 and C2 in one direction along the X direction (direction in which the first coil piece C1 and the second coil piece C2 are proximate), and also regulate movement of the coil pieces C1 and C2 in the other direction along the X direction (direction in which the first coil piece C1 and the second coil piece C2 separate). More specifically, the movement regulators 17 are roller bodies biased toward the center of the first holding portion 11 and the second holding portion 12 by the biasing members (such as a coiled spring, and a flat spring) 171. The movement regulators 17 have uneven shapes which are not shown (for example, saw tooth-shaped uneven shapes) formed along a peripheral direction on both the ends in a rotation center axis direction. The movement regulators 17 hold the flat conductors C with use of their roller body portions. For example, movement regulators 17A and 17B of the first holding portion 11 will be described. The movement regulator 17A is rotatable clockwise, and the movement regulator 17B is rotatable counter clockwise to bias the first coil piece C1 leftward in FIG. 7 (in the proximity (pressing) direction) along the X direction (i.e., the movement regulator 17A can also be referred to as a pressing direction biasing member). When the first coil piece C1 moves rightward in FIG. 7 along the X direction, the movement regulator 17A is going to rotate counter clockwise, while the movement regulator 17B is going to rotate clockwise. However, since the uneven shapes, provided along the peripheral direction on both the end portions in the central axis direction, gear each other to prevent rotation, the rightward movement of the first coil piece C1 is regulated. This also applies to the second holding portion 12.

On the outer side of the first holding portion 11 and the second holding portion 12 in the Y direction, a pressing portion 18 is provided. The pressing portion 18 presses the first upper holder 111 and the first lower holder 112 so that the first upper holder 111 and the first lower holder 112 come into contact with each other. The pressing portion 18 also presses the second upper holder 121 and the second lower holder 122 so that the second upper holder 121 and the second lower holder 122 come into contact with each other.

FIGS. 8 and 9 are front views of the first holding portion 11 and second holding portion 12 extracted to show the movement thereof.

FIG. 8 illustrates the movement of the first holding portion 11 (the first upper holder 111 and the first lower holder 112) and the second holding portion 12 (the second upper holder 121 and the second lower holder 122) mainly along the Y direction.

In the state shown in FIG. 8(A), the facing faces OS1 of the first upper holder 111 and the first lower holder 112 (similarly for the second upper holder 121 and the second lower holder 122) are at positions most separating from each other in the Y direction. The positions are hereinafter referred to as Y-direction separation positions. In this state, the facing faces OS2 of the first holding portion 11 and the second holding portion 12 are at positions most separating from each other in the X direction. The positions are hereinafter referred to as X-direction separation positions.

FIG. 8(B) shows the state where the facing faces OS1 of the first upper holder 111 and the first lower holder 112 move to the positions most proximate to each other from the state shown in FIG. 8(A). In this state, the first holding portion 11 pinches (the wider surface WS of) the first coil piece C1 with the first upper holder 111 and the first lower holder 112, and the second holding portion 12 pinches (the wider surface WS of) the second coil piece C2 with the second upper holder 121 and the second lower holder 122.

The first holding portion 11 pinches the first coil piece C1 by causing the first coil piece C1 to project toward the second holding portion 12 from the facing face OS2 along the Y direction. Similarly, the second holding portion 12 pinches the second coil piece C2 by causing the second coil piece C2 to project toward the first holding portion 11 from the facing face OS2 along the Y direction. A projection amount A1 of the first coil piece C1 from the first holding portion 11 and a projection amount A2 of the second coil piece C2 from the second holding portion 12 will be described later.

The positions where the facing faces OS1 of the first upper holder 111 and the first lower holder 112 (the second upper holder 121 and the second lower holder 122) are proximate to each other most in this way are called pinching positions in the following description. The first upper holder 111 and the first lower holder 112 (the second upper holder 121 and the second lower holder 122) are movable between the pinching positions and the Y-direction separation positions.

As shown in FIG. 8(C), between the pinching positions and the Y-direction separation positions, pinching release positions (in the Y direction) are included. The release positions in the Y direction (hereinafter Y-direction release positions) are positions where the first upper holder 111 and the first lower holder 112 (the second upper holder 121 and the second lower holder 122) separate from each other by a distance smaller than the distance between the Y-direction separation positions.

The first upper holder 111 and the first lower holder 112 can also shift to the state shown in FIG. 8(B) from the Y-direction release positions of FIG. 8(C) by moving to the positions where the facing faces OS1 of the first upper holder 111 and the first lower holder 112 (the second upper holder 121 and the second lower holder 122) are most proximate to each other.

In FIG. 8, the X-direction separation positions are maintained at any positions of the first holding portion 11 and the second holding portion 12 along the X direction.

FIG. 9 illustrates the movement of the first holding portion 11 and the second holding portion 12 mainly along the X direction.

FIG. 9(A) shows the positions after the first holding portion 11 and the second holding portion 12 move along the X direction from the state of FIG. 8(B) so that the facing faces OS2 are most proximate to each other. Hereinafter, the positions are called proximity positions. More specifically, the first holding portion 11 and the second holding portion 12 are movable in the X direction between the X-direction separation positions shown in FIG. 8 and the proximity positions shown in FIG. 9(A). Even in the proximity positions, the first holding portion 11 and the second holding portion 12 do not come into contact with each other.

In the pinching positions (FIG. 8(B)), the first holding portion 11 pinches the first coil piece C1 by causing the first coil piece C1 to project by the projection amount A, and the second holding portion 12 pinches the second coil piece C2 by causing the second coil piece C2 to project by the projection amount A2. Accordingly, when the first holding portion 11 and the second holding portion 12 are in the proximity positions (FIG. 9(A)), the first holding portion 11 and the second holding portion 12 do not come into contact with each other, but the first coil piece C1 and the second coil piece C2 are in contact with each other (welded) and further in the state of pressing each other. Accordingly, the projection amount A1 of the first coil piece C1 from the first holding portion 11 and the projection amount A2 of the second coil piece C2 from the second holding portion 12 are set to such the amounts that the first coil piece C1 and the second coil piece C2 not only come into contact with each other but also the first coil piece C1 and the second coil piece C2 are pressed against each other when the first holding portion 11 and the second holding portion 12 are in the proximity positions.

As shown in FIG. 9(B), pressing release positions (in the X direction) are included between the proximity positions (FIG. 9(A)) and the pinching positions (FIG. 8(B)). The release positions in the X direction (hereinafter, X-direction release positions) are positions where the first holding portion 11 and the second holding portion 12 separate from each other by a distance smaller than the distance between the X-direction separation positions (for example, the X-direction separation positions shown in FIG. 8(C)). When the first holding portion 11 and the second holding portion 12 are in the X-direction release positions, the first upper holder 111 and the first lower holder 112 also separate and move to the Y-direction release positions (for example, the Y-direction release positions shown in FIG. 8(C)), and the second upper holder 121 and the first lower holder 112 also separate and move to the Y-direction release positions.

The first holding portion 11 and the second holding portion 12 can also shift from the X direction release positions of FIG. 9(B) to the state (the proximity positions) shown in FIG. 9(A).

The holding surfaces of the first holding portion 11 and the second holding portion 12 (holding surfaces of the coil piece holding portions 111T, 112T, 121T, and 122T) for holding the flat conductors C1 and C2 are desirably subjected to anti-slip machining to implement reliable pinching (holding) of the flat conductors. Examples of the anti-slip machining include machining for enhancing frictional resistance, and machining for enhancing adsorption. Specifically, for example, the anti-slip machining increases frictional resistance by applying fine unevenness machining through sand blast or the like, or attaching fine particles or the like. The anti-slip machining may also form so-called saw-tooth shaped unevenness so as to make the frictional resistance in one region higher than the other region. The anti-slip processing may enhance the adsorptive power by creating a vacuum state, or may enhance the adsorptive power by the pressure of the vacuum or atomic force provided by mirror finishing. When the degree of the unevenness machining is large, an uneven electric field is generated (corona discharge), which may cause destruction of coating, or the like, in the case of manufacturing coils and the like. Therefore, the degree of the unevenness machining is desirably small enough to be achieved by sand blast.

The coil piece holding portions 111T, 112T, 121T, and 122T may be configured into the shape of a slot which can house (a held portion of) the coil pieces C.

The driving portion 13 moves the first holding portion 11 and the second holding portion 12 between the X-direction separation positions, the X-direction release positions, and the proximity positions along the X direction through a drive transmitter (not shown) on the basis of an instruction from the controller 14. For example, the drive transmitter can be constituted of appropriate component members, such as a direct-acting guide (linear guide), a cam mechanism, or a rack and a pinion. Along the Y direction through the drive transmitter (not shown) on the basis of an instruction from the controller 14, the driving portion 13 also moves the first upper holder 111 and the first lower holder 112 between the Y-direction separation positions, the pinching positions, and the Y-direction release positions, and moves the second upper holder 121 and the second lower holder 122 between the Y-direction separation positions, the pinching positions, and the Y-direction release positions.

Thus, the driving portion 13 can control the first holding portion 11 and the second holding portion 12 to be in any one of a pinching state (FIG. 8(B)), a pressure welding state (FIG. 9(A)), a pressure welding released state (FIG. 8(C), FIG. 9(B)), a shunting state (FIG. 8(A)), and a transition state between two of these states.

More specifically, in the pinching state, the first upper holder 111 and the first lower holder 112 of the first holding portion 11 are moved from the Y-direction separation positions (FIG. 8(A)) to the pinching positions (FIG. 8(B)) along the Y direction, and the first upper holder 111 and the first lower holder 112 are made to pinch the first coil piece C1. The second upper holder 121 and the second lower holder 122 of the second holding portion 12 are moved from the Y-direction separation positions (FIG. 8(A)) to the pinching positions (FIG. 8(B)) along the Y direction, and the second upper holder 121 and the second lower holder 122 are made to pinch the second coil piece C2.

As described before, the first holding portion 11 pinches the first coil piece C1 by causing the first coil piece C1 to project from the facing face OS2 toward the second holding portion 12 by the projection amount A1 along the Y direction. The second holding portion 12 pinches the second coil piece C2 by causing the second coil piece C2 to project from the facing face OS2 toward the first holding portion 11 by the projection amount A2 along the Y direction.

In the pinching state, the first upper holder 111 and the first lower holder 112 of the first holding portion 11 in the Y-direction release positions (FIG. 8(C)) may be moved to the pinching positions (FIG. 8(B)), and the first upper holder 111 and the first lower holder 112 may be made to pinch the first coil piece C1. The second upper holder 121 and the second lower holder 122 of the second holding portion 12 in the Y-direction release positions (FIG. 8(C)) may be moved to the pinching positions (FIG. 8(B)), and the second upper holder 121 and the second lower holder 122 may be made to pinch the second coil piece C2.

In the pressure welding state, the first holding portion 11 and the second holding portion 12 in the pinching state move from the X-direction separation positions (FIG. 8(B)) to the proximity positions (FIG. 9(A)) along the X direction against the biasing force of the biasing member 15. At the time, the first coil piece C1 projects from the first holding portion 11, and the second coil piece C2 projects from the second holding portion 12. The projection amount A1 and A2 are set to such the amounts that the first coil piece C1 and the second coil piece C2 not only come into contact with each other but also the first coil piece C1 and the second coil piece C2 are pressed against each other when the first holding portion 11 and the second holding portion 12 are in the proximity positions (FIG. 9(A)). In short, before (immediately before) moving to the proximity positions, the end faces of the first coil piece C1 and the second coil piece C2 which face each other first touch (come into contact with) each other. Then, the driving portion 13 moves the first holding portion 11 and the second holding portion 12 to the proximity positions (FIG. 9(A)). As a consequence, the end face TS1 of the first coil piece C1 and the end face TS2 of the second coil piece C2 which are in contact with each other are made to butt each other, pressed, and welded. More specifically, when the end faces TS1 and TS2 of the first coil piece C1 and the second coil piece C2 are pressed to each other, stable oxide films formed on the end faces TS1 and TS2 are removed, and the end faces TS1 and TS2 are plastically deformed so that the surfaces in an active state are exposed. The surfaces in the active state are brought close to each other within 10 angstroms to induce bonding of atoms between metals to be welded, so that cold pressure welding is performed. In short, with the cold pressure welding, the length of the first coil piece C1 and the second coil piece C2 in the strip longitudinal direction is compressed (reduced) after the pressure welding as compared with before pressure welding. The amount of reduction in the first coil piece C1 is equal to that in the second coil piece C2.

More specifically, when the length of the first coil piece C1 before pressure welding is L01, and the length of the second coil piece C2 before pressure welding is L02, the length of the first coil piece C1 is reduced to L01', and the length of the second coil piece C2 is reduced to L02' by pressure welding. The reduction amounts SC are equal to each other (SC=L01−L01'=L02−L02').

After moving to the proximity positions, the first holding portion 11 and the second holding portion 12 do not come close to each other anymore. Hence, no more pressing is made between the end faces of the first coil piece C1 and the second coil piece C2.

In the pressure welding state, the first upper holder 111, the first lower holder 112, the second upper holder 121, and the second lower holder 122 in the Y-direction release positions (FIG. 8(C)), or the Y-direction release positions and the X-direction release positions (FIG. 9(B)) are moved to the pinching positions (FIG. 8(B)). The first holding portion 11 and the second holding portion 12 are moved to the proximity positions against the urging force of the biasing member 15. In the proximity positions, the end face TS1 of the first coil piece C1 and the end face TS2 of the second coil piece C2 are butted, pressed, and cold pressure-welded. (FIG. 9(A)).

In the pressure welding released state, the first holding portion 11 and the second holding portion 12 in the pressure welding state are controlled to move in a separating direction along the X direction, so that the first holding portion 11 and the second holding portion 12 are moved to the X-direction release positions. The first upper holder 111 and the first lower holder 112 are also controlled to move in the separating direction along the Y direction, so that the first upper holder 111 and the first lower holder 112 are moved to a first Y-direction release positions. The second upper holder 121 and the second lower holder 122 are also controlled to move in the separating direction along the Y direction, so that the second upper holder 121 and the second lower holder 122 are moved to a second Y-direction release positions (FIG. 9(B)).

In the pressure welding state, the first holding portion 11 and the second holding portion 12 reach the proximity positions in the end, and no more pressing of the first coil piece C1 and the second coil piece C2 is performed. Accordingly, in order to repeat pressing, the operation state shifts from the pressure welding state to the pinching state through the pressure welding released state. In the pinching state, the first holding portion 11 and the second holding portion 12 pinch the first coil piece C1 and the second coil piece C2 again.

Here, when the pressure welding state is changed to the pressure welding released state (when pressure welding is released), the biasing member 15 applies biasing force in the direction of separating the first upper holder 111 and the first lower holder 112 (similarly for the second upper holder 121 and the second lower holder 122). However, in some cases, some part of metal (expanded welded surface), which is fluidized by plastic deformation of the metal caused by pressing, sticks with the first holding portion 11 and the second holding portion 12. In such cases, it may be difficult to separate the first upper holder 111 and the first lower holder 112 (similarly for the second upper holder 121 and the second lower holder 122) only with the biasing force of the biasing member 15.

Accordingly, in the present embodiment, in the pressure welding released state (FIG. 9(B)), in addition to using the biasing force of the biasing member 15, the drive transmitter is used. Through the drive transmitter, the first holding portion (the first upper holder 111 and the first lower holder 112) are moved in the direction of separating from the second holding portion 12 along the X direction so as to return to first X-direction release positions. The second holding portion (the second upper holder 121 and the second lower holder 122) are also moved in the direction of separating from the first holding portion 11 along the X direction through the drive transmitter so as to return to second X-direction release positions.

Even in the case of moving the first holding portion 11 and the second holding portion 12 in the separating direction by force in addition to the aid of the biasing member 15, the movement regulators 17 regulate the movement of the first coil piece C1 and second coil piece C2 in the direction of separating from each other along the X direction.

In the shunting state, the first holding portion 11 and the second holding portion 12 in the pressure welding state, the pressure welding released state, or the pinching state are controlled to move to the X-direction separation positions along the X direction. The first upper holder 111 and the first lower holder 112 are also moved along the Y direction to the Y-direction separation positions, while the second upper holder 121 and the second lower holder 122 are moved along the Y direction to the Y-direction separation positions (FIG. 8(A)).

Here, the welding device 20 can perform cold pressure welding of the flat conductors by one pressing session. However, it is desirable that pressing be repeated a plurality of times for one welding portion to stabilize the welded surface.

For example, in the cold pressure welding of one welded portion CP, the welding device 20 performs pressing with the pressing time in one pressing session being shortened (for example, 5 seconds or less), the number of pressing sessions being increased (for example, about three to ten), and the interval of pressing being also shortened to the extent that the welded region is not oxidized.

More specifically, the welding device 20 presses the first coil piece C1 and the second coil piece C2 with a pressing-in amount (compression amount) of about 0.5 mm in one pressing session. For example, the welding device 20 repeats the pressing session of about 5 seconds or less for three to ten times for one welded portion CP so as to compress the welded portion CP by about 1 mm or more (preferably 1.5 mm or more, and specifically about 2 mm). With the pressing operation, the stable welded surface is obtained.

Thus, the welding device 20 of the present embodiment repeats the pinching state, the pressure welding state, and the pressure welding released state, so as to perform cold pressure welding between the first coil piece C1 and the second coil piece C2.

When the welding device 20 is in the pressure welding state (FIG. 9(A)) after the pinching state (FIG. 8(B)), and so the first holding portion 11 and the second holding portion 12 move in the proximity positions, the end faces of the first coil piece C1 and the second coil piece C2 touch (come into contact with) each other, and then the end faces are pressed and cold pressure-welded. Since the first holding portion 11 and the second holding portion 12 in the proximity positions (pressure welding states) do not come close to each other anymore, the pressure welding state once shifts to the pressure welding release state (FIG. 9(B)), where the first holding portion 11 and the second holding portion 12 are moved to the Y-direction release positions to release pinching of the flat conductors C1 and C2, and the first holding portion 11 and the second holding portion 12 are moved to the X-direction release positions. Then, the pressure welding release state shifts to the pinching state, where the first holding portion 11 holds the first coil piece C1 so that the first coil piece C1 projects by the prescribed projection amount A1, and the second holding portion 12 holds the second coil piece C2 so that the second coil piece C2 projects by the projection amount A2. Then, the pinching state shifts to the pressure welding state again. In this way, pressing operation of one welded portion can be repeated a plurality of times.

More specifically, in the X-direction release positions, the first holding portion 11 can pinch the first coil piece C1 while causing the first coil piece C1 to project by the projection amount A1, and the second holding portion 12 can pinch the second coil piece C2 while causing the second coil piece C2 to project by the projection amount A2.

The X-direction release positions may not be the positions where the flat conductors project by the projection amounts A1 and A2, when the first holding portion 11 and the second holding portion 12 shift to the pinching state thereafter (with their positions unchanged). In that case, the first holding portion 11 and the second holding portion 12 may be moved to the positions where the flat conductors project by the projection amounts A1 and A2, and then perform pinching in the positions.

As shown by a broken line circle of FIG. 9(A), in addition to the movement regulators 17, the welding device 20 may further include other movement regulators (fixed members 16) that regulate the movement of the first coil piece C1 and the second coil piece C2 in the separating direction along the X direction, and regulate the movement of the first coil piece C1 and the second coil piece C2 along the Y direction.

For example, the fixed members 16 include two pairs of cylindrical protruding portions 161 and 162 having an interval, the interval being slightly wider than the board thickness of a portion of the first coil piece C1 and the second coil piece C2 which is not plastically deformed and being narrower than the length of the welded portion CP in the board thickness direction as shown by the circle in FIG. 9(A). The fixed members 16 also include a (for example, prismatic) protruding portion (or plate) 163 including a pair of regulating surfaces 163A provided on the outside of both ends in the board thickness direction of the welded portion.

With the fixed members 16, in the compression releasing state (FIG. 9(B)) or the shunting state (FIG. 8(A)), when the driving portion 13 moves the first holding portion 11 and the second holding portion 12 to the Y-direction release positions and the X-direction release positions, or the Y-direction separation positions and the X-direction separation positions, movement of the first coil piece C1 and the second coil piece C2 is regulated even in the case where the first coil piece C1 and the second coil piece C2 are in close contact with the first holding portion 11 or the second holding portion 12. Specifically, for example, the cylindrical protruding portions 161 regulate the movement of the first coil piece C1 in the direction (rightward in FIG. 9(A)) of separating from the second coil piece C2 along the X direction. The protruding portions 162 regulate the movement of the second coil piece C2 in the direction (leftward in FIG. 9(B)) of separating from the first coil piece C1 along the X direction. The protruding portions 163 having the regulating surfaces 163A regulate the movement of the first coil piece C1 and the second coil piece C2 upward or downward along the Y direction as illustrated.

Thus, the first coil piece C1 and the second coil piece C2 can maintain the positions immediately after the pressure welding, and can enhance the stability of the welded surface of the welded portion CP. This makes it possible to prevent the welded portion CP from separating in connection with the first holding portion 11 and the second holding portion 12 after pressure welding.

The fixed members 16 are not limited to protruding portions or plates, and may be pressing members made of rubber. The fixed members 16 may be omitted. Depending on the conditions of pressure welding, these fixing members 16 may be omitted.

In the embodiment described above, the first holding portion 11 and the second holding portion 12 are configured to stop in the X-direction release positions and the Y-direction release positions in the pressure welding release state. However, the first holding portion 11 and the second holding portion 12 may be configured to pass the X-direction release positions and the Y-direction release positions but not to stop at the positions. More specifically, the first upper holder 111 and the first lower holder 112 (similarly for the second upper holder 121 and the second lower holder 122) may move between the pinching position, the Y-direction release positions, and Y-direction separation positions without stopping therein. The first holding portion 11 and the second holding portion 12 may move between the proximity positions, the X-direction release positions, and the X-direction separation positions without stopping therein.

In the past, cold pressure welding has been utilized when round wires are welded. According to the aforementioned welding device 20 of the present embodiment, sufficient and stable cold pressure welding of flat conductors can be performed.

Figure 10:
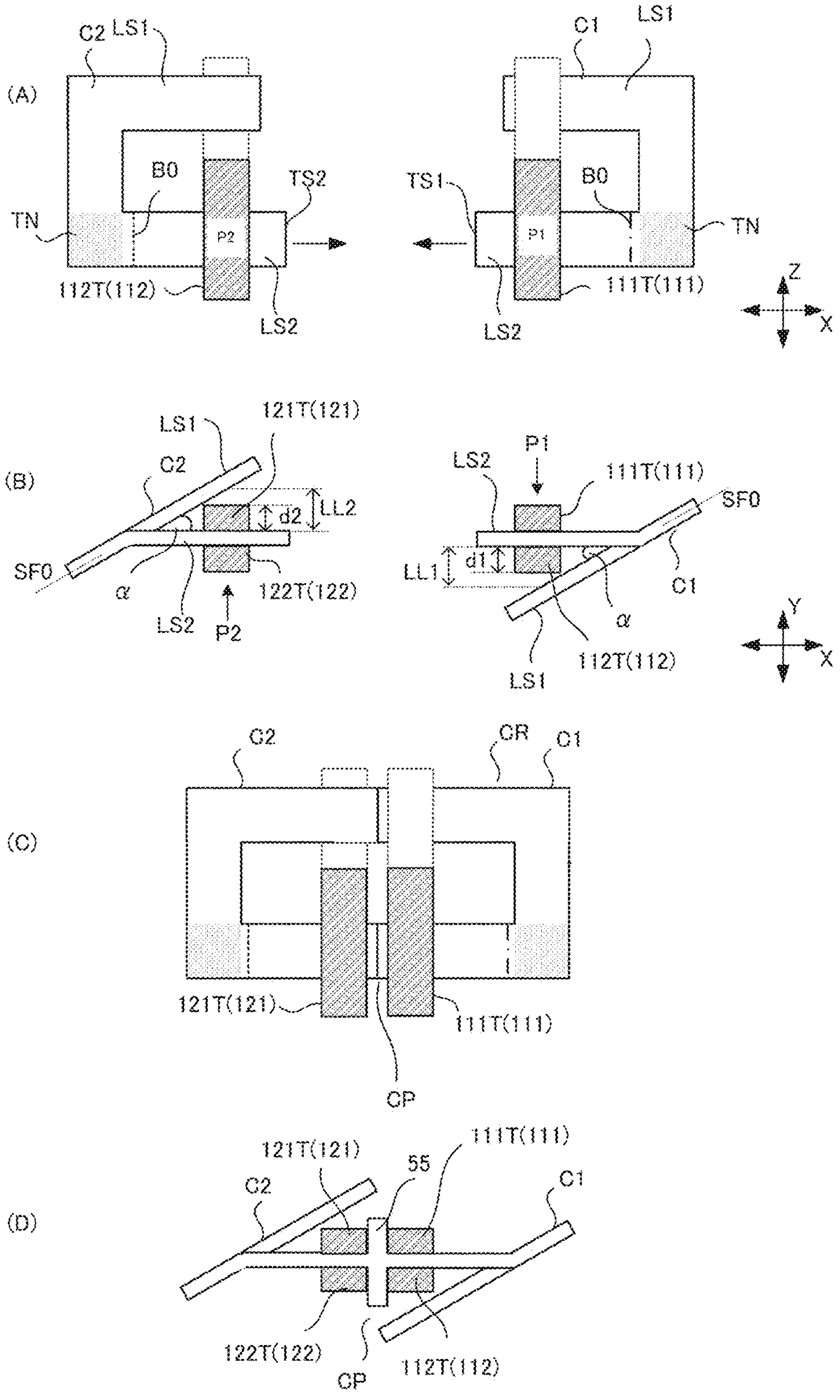

Here, with reference to FIG. 10, each of the coil piece holding portions 111T, 112T, 121T, and 122T of the first holding portion 11 and the second holding portion 12 will further be described. FIG. 10 shows partially extracted portions of the coil piece holding portions 111T and 112T of the first holding portion 11, and the coil piece holding portions 121T and 122T of the second holding portion 12. FIG. 10(A) is a top view of the pinching state (FIG. 8(B)). FIG. 10(B) is a front view of the welding device 20 as viewed from the lower side (lower side in Z direction) of FIG. 10(A) (side view for the coil pieces C). FIG. 10 (C) is a top view of the pressure welding state (FIG. 9(A)). FIG. 10(D) is a front view of the welding device 20 as viewed from the lower side (lower side in Z direction) of FIG. 10(C) (side view for the coil pieces C).

In the present embodiment, the coil pieces C (C1, C2) are pressure-welded at their linear parts. The coil pieces C are added and pressure-welded one piece at a time to form a helical structure body.

For example, the portions to be pressure-welded are portions that constitute the longer side of the region CR for one turn (the longer side regions LS1, LS2) and that are other than the direction change portion TN in the region CR for one turn. Therefore, the pressure welding regions (the welded portions CP) position at a portion on the longer side of the region CR for one turn (for example, near the center).

Joining between the coil piece C1 and the coil piece C2 is made by joining one side of the coil piece C1 having the bent portion B0 (for example, the longer side region LS2) and one side of the coil piece C2 having the bent portion B0 (for example, the longer side region LS2). Alternatively, joining between the coil piece C1 and the coil piece C2 is made by joining one side of the coil piece C1 without having the bent portion B0 (for example, the longer side region LS1) and one side of the coil piece C2 without having the bent portion B0 (for example, the longer side region LS1).

Here, joining between the coil piece C1 and the coil piece C2 is made by joining one side of the coil piece C1 having the bent portion B0 (the longer side region LS2) and one side of the coil piece C2 having the bent portion B0 (the longer side region LS2) as shown in FIG. 10(A).

More specifically, as shown in this example, in the case of the coil pieces C (such as U-shaped and C-shaped coil pieces C) having opposite the longer side regions LS1 and LS2, for example, the first holding portion 11 (the coil piece holding portions 111T and 112T) is first inserted to, for example, the longer side region LS2 of the coil piece C1 in a Z direction from the lower side shown in FIG. 10(A) and held there. The second holding portion 12 (the coil piece holding portions 121T and 122T) is also inserted to, for example, the longer side region LS2 of the coil piece C2 in the Z direction and held there. Then, their end faces TS1 of and TS2 are pressure-welded. For example, the other longer side region LS1 of the coil piece C2 is pressure-welded to one longer side region LS1 of a next coil piece C (C3), which is not shown, at another timing.

Accordingly, in the case where the first holding portion 11 and the second holding portion 12 hold the longer side region LS2 of the coil piece C1 and the longer side region LS2 of the coil piece C2, it is necessary to avoid interference of the other longer side regions LS1 of the coil pieces C1 and C2, which are not pressure-welded at that timing, with the first holding portion 11 and the second holding portion 12 (the coil piece holding portions 111T, 112T, 121T, and 122T).

In the case of pressure-welding the coil pieces C before deformation (the plate-shaped coil pieces C having the longer side regions LS1, LS2 and the shorter side SS which are substantially coplanar, the coil pieces C without the bent portion B0 formed therein) as in the upper row of FIG. 3(B), inserting the coil piece holding portions 111T, 112T, 121T, and 122T toward the shorter sides SS of the coil pieces C by a random distance may cause the coil piece holding portions to interfere with the other longer side regions LS1 which are not pressure-welded at that timing as shown by the top end broken line portions of the coil piece holding portions 111T, 112T, 121T, and 122T shown in FIG. 10(A).

Therefore, in this case, as shown by a slanting line hatching in FIG. 10(A), it is necessary to set (control) the insertion positions so that the top end portions (end portions on the upper side in FIG. 10(A)) of the first holding portion 11 and the second holding portion 12 (the coil piece holding portions 111T 112T, 121T, and 122T) are reliably disposed within an inner periphery portion of the region CR for one turn.

The helical structure body of the present embodiment is configured by sequentially connecting the coil pieces C. Hence, as the number of the welded coil piece C increases, they are linked toward the lower side of FIG. 10(B), and the coil pieces C (the welded coil piece CC) become random expansible due to spring-shaped configuration. Therefore, the welded coil piece CC unspecifically expand and contract due to self-weight, and their state of expansion changes also with the welded number of the unit coil pieces C0. Accordingly, the shapes of the welded coil piece CC when the first holding portion 11 and the second holding portion 12 hold the welded coil piece CC (intervals between the regions CR for one turn when the first holding portion 11 and the second holding portion 12 (the coil piece holding portions 111T, 112T, 121T, and 122T) are inserted) become unspecified (unstable). This further complicates the setting (or control) for avoiding interference with the other longer side regions LS1.

Accordingly, in the present embodiment, the bending device 30 deforms the coil pieces C into prescribed shapes in advance, so as to maintain the shapes of the coil pieces C held by the first holding portion 11 and the second holding portion 12 in the prescribed shapes.

Specifically, before pressure welding by the welding device 20, the bending device 30 forms the bent portion B0 bent such that the longer side region LS1 of the coil piece C is inclined with respect to the other longer side region LS2 at a prescribed angle α.

As shown in FIG. 10(B), the angle α of the bent portion B0 is, for example, an angle of inclination of the longer side region LS2 of the coil piece C1 with respect to the longer side region LS1 that is on the reference plane SF0 so as to prevent interference between the longer side region LS1 and the coil piece holding portion 112T (similarly for the coil piece holding portion 111T). The angle α is also an angle of inclination of the longer side region LS2 of the coil piece C2 with respect to the longer side region LS1 on the reference plane SF0 so as to prevent interference between the longer side region LS1 and the coil piece holding portion 121T (similarly for the coil piece holding portion 122T).

More specifically, one coil piece C1 is pinched substantially in a pinching region P1 by the coil piece holding portions 111T and 112T. In this case, the coil piece C1 (the longer side region LS2) is bent at such an angle α that a clearance LL1 between the longer side region LS1 and the longer side region LS2 of the coil piece C1 in a pinching direction (Y direction) as viewed from the side becomes larger than a thickness d1 of the coil piece holding portion 112T (111T) in the pinching direction.

Similarly, the other coil piece C2 is pinched substantially in a pinching region P2 by the coil piece holding portions 121T and 122T. In this case, the coil piece C2 (the longer side region LS2) is bent at such an angle α that a clearance LL2 between the longer side region LS1 and the longer side region LS2 of the coil piece C2 in the pinching direction (Y direction) as viewed from the side becomes larger than a thickness d2 of the coil piece holding portion 121T (122T) in the direction of pinching.

Such configuration makes it possible to avoid unstable expansion of the welded coil piece CC and to maintain the interval between the regions CR for one turn to a (substantially) prescribed interval even in the case where the length in the helical traveling direction increases.

Therefore, as shown in FIG. 10(B), it is possible to reliably secure the space (space in the Y direction and the thickness direction) used for inserting the first holding portion 11 and the second holding portion 12 (the coil piece holding portions 111T, 112T, 121T, and 122T). As shown by the broken line in FIG. 10(C), the top end portions of the first holding portion 11 and the second holding portion 12 (one end portions of the coil pieces C in a strip transverse direction) can optionally be positioned (it becomes unnecessary to ensure that the top end portions are disposed within the inner periphery area of the region CR for one turn). This eliminates the necessity of complicated setting or control for avoiding interference of the first holding portion 11 and the second holding portion 12 with other longer side regions LS2, which can achieve considerable increase in pressure welding speed.

The space used for inserting the first holding portion 11 and the second holding portion 12 (the coil piece holding portions 111T, 112T, 121T, and 122T) is desirably secured also in the X direction of FIG. 10. The description thereof will be given with reference to FIG. 11.

Figure 11:
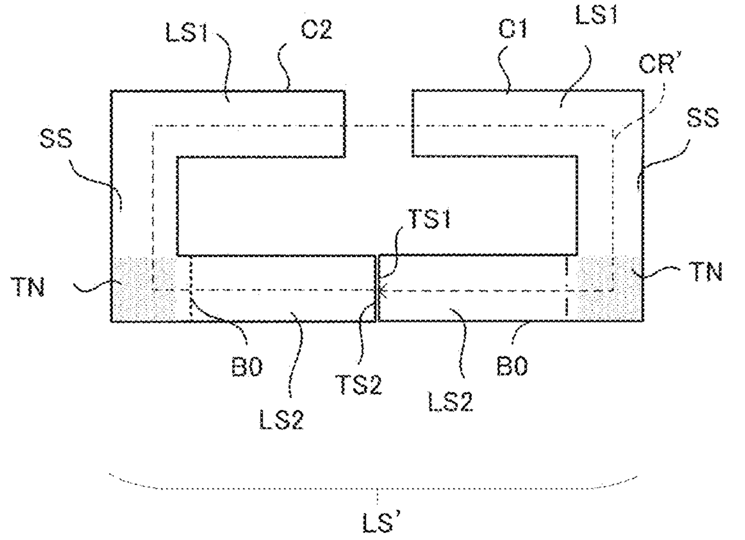
FIGS. 11(A) and 11(B) include diagrams illustrating a bent portion of the coil pieces according to the present embodiment.
Figure 11:
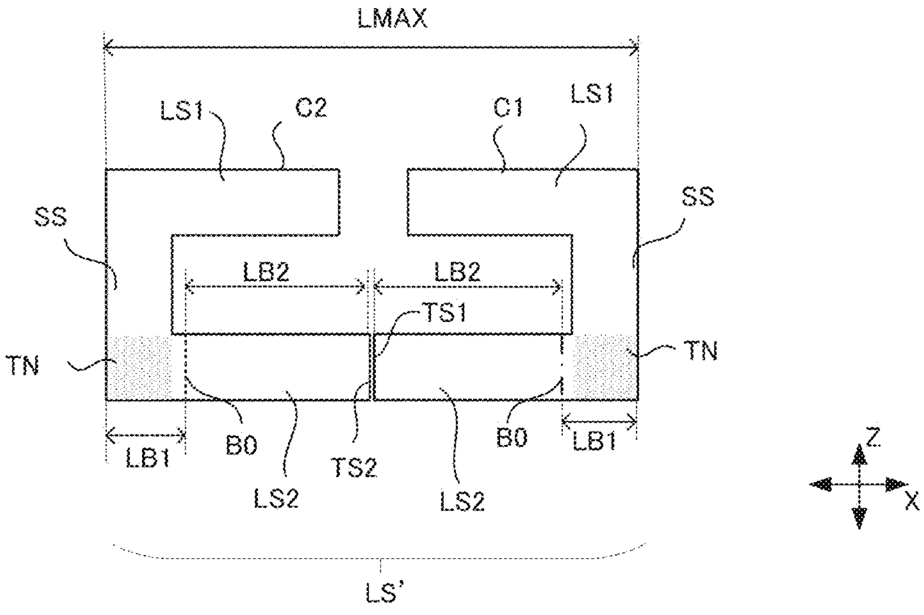

FIG. 11 includes top views for further describing the position of forming the bent portion B0 with the U-shaped coil pieces C (C1, C2) as an example. These views correspond to FIGS. 10(A) and 10(C).

In the case of the U-shaped coil pieces C, a helical structure body is formed, as described later in detail, by disposing two coil pieces C1 and C2 so as to face each other, and connecting the longer side regions (the longer side regions LS2 in this example) having the bent portion B0 formed therein, or connecting the longer side regions (the longer side regions LS1 in this example) without the bent portion B0 formed therein.

In the case of connecting the longer side regions LS2 having the bent portion B0 formed therein, the coil piece holding portions 111T, 112T, 121T, and 122T pinch regions between the bent portions B0 and the end faces TS1 and TS2 to be pressure-welded (see FIG. 10(A)). In other words, the bent portions B0 are formed at the positions where the coil piece holding portions 111T, 112T, 121T, and 122T can reliably pinch the regions between the bent portions B0 and the end faces TS1 and TS2 to be pressure-welded.

Specifically, as shown in FIG. 11, the bent portion B0 is formed in a region excluding and in the vicinity of the direction change portion TN in the longer side region LS2.

More specifically, the bent portion B0 is desirably provided so as to be positioned, for example, within a range of less than 30% from an end portion of "a maximum length LMAX in the strip longitudinal direction of the longer side LS which constitutes the region CR for one turn (maximum length in the strip longitudinal direction of a region scheduled to be the longer side LS which constitutes the region CR for one turn)".

For example, as shown in FIG. 11(A), the region for one turn of a virtual helical structure body in the state where the end faces TS1 and TS2 of the coil pieces C1 and C2 are in contact with each other (the state before pressure welding) is defined as a virtual region CR' for one turn. In this case, a longer side LS' constituting the virtual region CR' for one turn is a total length of the longer side region LS2 of the coil piece C1 and the longer side region LS2 of the coil piece C2. The longer side regions LS2 are pressure-welded from the state in contact with each other, and are shortened, so that a longer side LS constituting the region CR for one turn is obtained.

In other words, the length in the strip longitudinal direction of the longer side LS' constituting the virtual region CR' for one turn (total length of the longer side region LS2 of the coil piece C1 and the longer side region LS2 of the coil piece C2) is the aforementioned "maximum length LMAX of the longer side LS, constituting the region CR for one turn, in the strip longitudinal direction" (FIG. 11(B)).

The bent portion B0 is desirably formed so as to be at a position in the longer side region LS2 (region excluding the direction change portion TN shown by a hatching) that is within a range of, for example, less than 30% of the maximum length LMAX (total length of the longer side region LS2 of the coil piece C1 and the longer side region LS2 of the coil piece C2) from the end portion on the side of the shorter side SS, i.e., a position where length $LB1 < LMAX \times 30\%$.

With the configuration, as the pinching regions P1 and P2 of the coil piece holding portions 111T, 112T, 121T, and 122T (see FIG. 10), the regions can be secured in the longer side LS' of the virtual region CR' for one turn, the regions including the center of the longer side LS' and the right and left side of the center, the regions having a length of 40% or more of the maximum length LMAX (2×length LB2≥LMAX×40%).

Alternatively, the bent portion B0 may be formed at a position, in each of the coil pieces C1 and C2, where a length LB1 from the end portion on the side of the shorter side SS to the bent portion B0 is equal to or less than a length LB2 form the bent portion B0 to the end face TS (TS1, TS2).

With the configuration, as the pinching regions P1 and P2 of the coil piece holding portions 111T, 112T, 121T, and 122T (see FIG. 10), the regions can be secured in the longer side LS' of the virtual region CR' for one turn, the regions including the center of the longer side LS' and the right and left side of the center, the regions having a length of 50% or more of the maximum length LMAX (2×length LB2≥LMAX×50%).

When the length of the region securable as the pinching regions P1 and P2 of the coil piece holding portions 111T, 112T, 121T, and 122T is short, there is a possibility that pinching may become difficult. In the present embodiment, however, as the pinching regions P1 and P2, the regions can be secured in the longer side LS' of the virtual region CR' for one turn, the region including the center of the longer side LS' and having a length of 40% or more of the maximum length LMAX. Hence, pinching with the coil piece holding portions 111T, 112T, 121T, and 122T is facilitated. This also eliminates the necessity of complicated setting or control for avoiding interference of the first holding portion 11 and the second holding portion 12 with the other longer side regions LS2, which can achieve considerable increase in pressure welding speed.

It is naturally understood that the position to form the bent portion B is set in consideration of the width in the X direction of the coil piece holding portions 111T, 112T, 121T, and 122T and the amount of pressure welding (amount of pressing) applied to the coil pieces C.

As shown in FIG. 10(D), after performing cold pressure welding of the two coil pieces C1 and C2, burr 55 are generated in the welded portion CP due to extrusion. With the burr 55 remaining, they may interfere with the first holding portion 11 and the second holding portion 12 at the time of next pressure welding. Accordingly, in the present embodiment, after cold pressure welding is completed, the coil piece (the welded coil piece CC) is taken out from the first holding portion 11 and the second holding portion 12 to remove the burr 55 in the removing device 40. Then, cold pressure welding is performed between the coil piece C (the welded coil piece CC) and another (new) coil piece C.

In the present embodiment, for the convenience of description, the welded portion CP is illustrated in each drawing. However, in the actuality, it is substantially impossible (very difficult) to visually recognize the welded portion.

Figure 12:
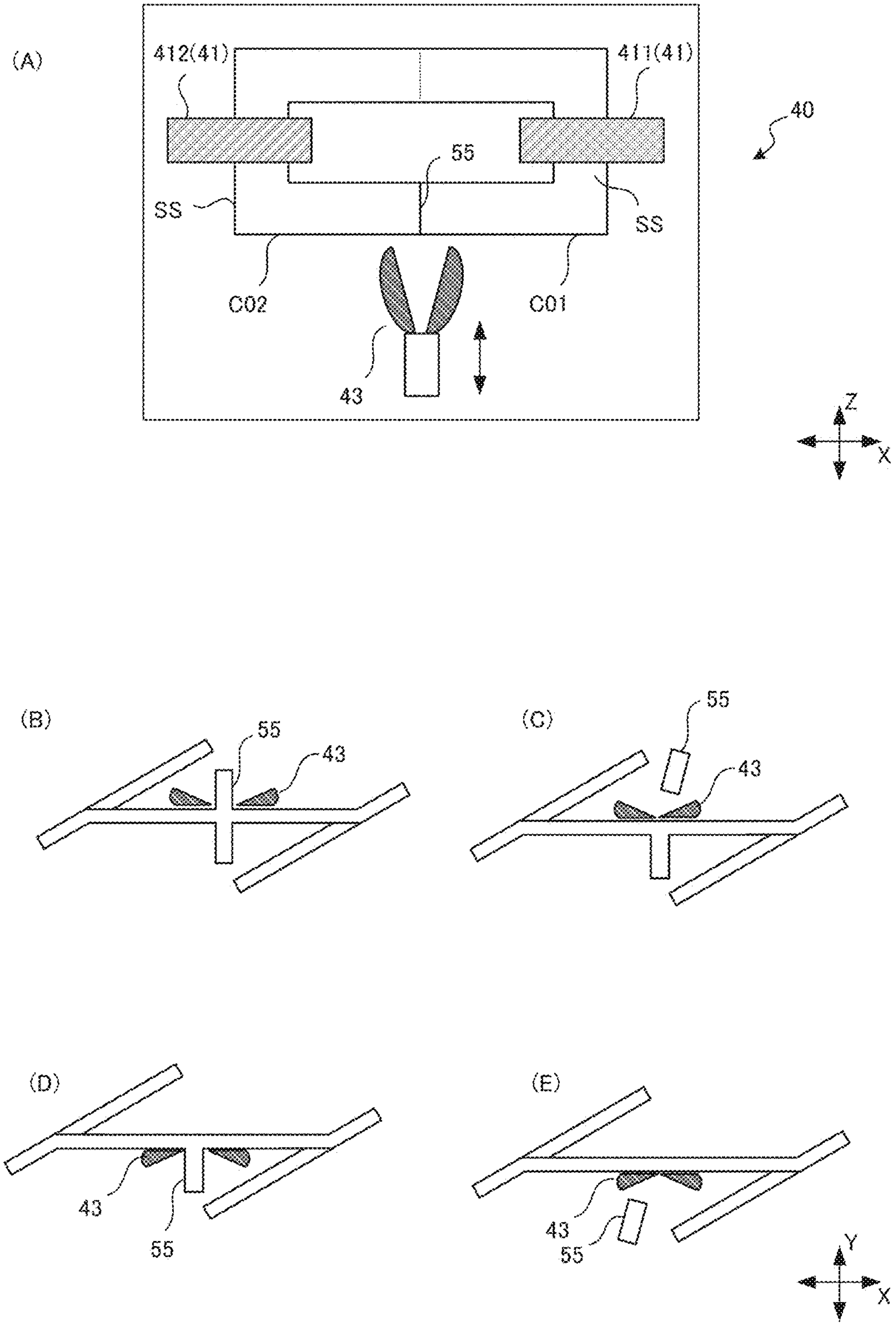

The removing device 40 will be described with reference to FIG. 12. FIG. 12 is a schematic view of the removing device 40. FIG. 12(A) is a top view similar to FIG. 10(A) and FIG. 10(C). FIGS. 12B to 12(E) are front views (side views for the welded coil piece CC) of the removing device 40 similar to FIG. 10(B) and FIG. 10(D).

As shown in FIG. 10(D), the welded coil piece CC immediately after discharge from the welding device 20 has burr 55 in the welded portion. In the welded portion, the burr 55 are generated in a vertical up-down direction so as to be substantially orthogonal to the wider surface WS of the welded coil piece CC.

The removing device 40 is a device for removing some portions of the welded coil piece CC after cold pressure welding. More specifically, the removing device 40 removes the burr 55 generated by pressing two coil pieces C.

Specifically, as shown in FIG. 12, the removing device 40 includes a coil piece holding portion 41 and a removing portion 43. The coil piece holding portion 41 is composed of a first coil piece holding portion 411 and a second coil piece holding portion 412 disposed so as to face each other. The first coil piece holding portion 411 and the second coil piece holding portion 412 hold both the sides of the coil piece (for example, shorter side SS portions) separated by a prescribed distance in the strip longitudinal direction (holds so as to pinch both the surfaces of the wider surfaces WS, respectively) across the burr 55 after welding of the welded coil piece CC.

For example, the removing portion 43 is a cutting unit (scissors) capable of advancing to and retreating from the coil piece C, held by the coil piece holding portion 41, for example, in the Z direction. The removing portion 43 can also ascend and descend in the Y direction.

The coil piece (the welded coil piece CC) welded in the welding device 20 is extracted from the welding device 20 by a robot, or the like, and is conveyed to the removing device 40 (see FIG. 1). In the removing device 40, when the coil piece holding portion 41 holds the welded coil piece CC, the removing portion 43 which has retreated to, for example, a rear side in the Z direction (lower side of FIG. 12(A)) advances forward in the Z direction (in the direction of the welded coil piece CC) (FIG. 12(B)). The removing portion 43 first cuts, for example, the burr 55 projecting upward (FIG. 12(C)). Then, the removing portion 43 once retreats to the rear side in the Z direction, and moves downward in the Y direction. After that, the removing portion 43 advances forward again in the Z direction (FIG. 12(D)), and cuts the burr 55 projecting downward (FIG. 12(E)).

Although illustration is omitted, the cutting unit of the removing portion 43 is not limited to scissors, and may be, for example, a cutter having a saw blade which can move horizontally (rotate horizontally).

Thus, since the removing device 40 removes the burr 55 whenever the welding by the welding device 20 is completed, interference of the first holding portion 11 and the second holding portion 12 with the welded coil piece CC can be avoided. In short, the welded coil piece CC can be welded with a new coil piece C constantly in the state where the burr 55 of the welded portion CP is removed and interference of the first holding portion 11 and the second holding portion 12 with the welded coil piece CC is avoided.

Figure 13:
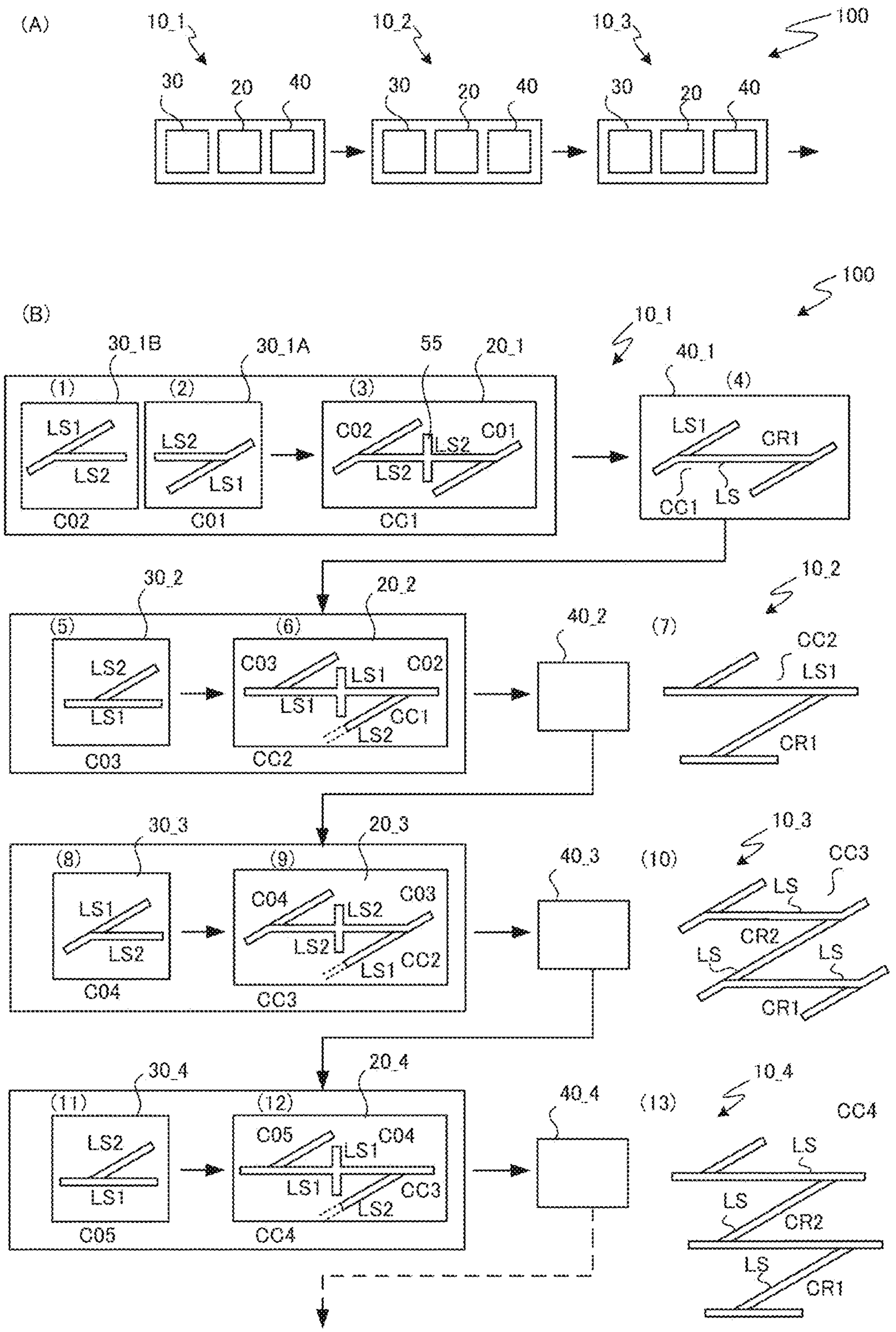
FIGS. 13(A) and 13(B) include diagrams illustrating the outline of a coil manufacturing system according to the present embodiment.

Next, a coil manufacturing system 100 of the present embodiment and a coil manufacturing method for sequentially connecting a plurality of coil pieces C using the coil manufacturing system 100 will be described with reference to FIG. 13.

FIG. 13(A) is a schematic view of the coil manufacturing system 100. FIG. 13(B) shows specific examples of the coil manufacturing system 100 and a welded coil piece CC sequentially formed.

As shown in FIG. 13(A), in the present embodiment, one or two bending device 30, one welding device 20, and one removing device 40 are unitized as one coil manufacturing apparatus 10. The coil manufacturing units (coil manufacturing apparatuses) 10_1, 10_2, 10_3 . . . are prepared in accordance with the number of turns (the number of the regions CR for one turn) of a coil 50 (helical structure body), and the units are aligned into one or a plurality of lines to constitute the coil manufacturing system 100.

For example, when the coil 50 with the number of turns being set to five (10 coil pieces C are used) is manufactured using only the U-shaped coil pieces, the coil manufacturing system 100 is constituted of nine coil manufacturing units 10_1 to 10_9 connected in series, for example. The welded coil piece CC is formed by performing deformation (formation of the bent portion B0), welding, and deburring of the coil piece whenever an unit coil piece C0 is welded.

In this case, for example, four coil manufacturing units 10 and five coil manufacturing units 10 may be arranged to be operated in parallel. Two welded coil piece CC manufactured by these coil manufacturing units 10 may be welded in the end to form a coil 50 having five turns.

A specific description will be given with reference to FIG. 13(B). FIG. 13(B) shows the state of the coil pieces C (the unit coil pieces C0 and the welded coil piece CC) during a manufacturing process in each coil manufacturing unit (coil manufacturing apparatus) 10. The coil pieces C are illustrated as the front view in the coil manufacturing unit 10 (side view of the coil pieces C). The coil pieces C (the welded coil piece CC) in the welding device 20 in each of the coil manufacturing units 10 shown in FIG. 13(B) are those extracted as the coil pieces C welded in the corresponding device.

Here, in one example, the plurality of U-shaped (Japanese katakana "ko"-shaped) unit coil pieces C0 (in this example, five (unit coil pieces C01, C02, C03, C04, and C05)) having two direction change portions TN are prepared, and these unit coil pieces C0 are connected (continuously joined) to manufacture a coil (helical structure body) 50 (the welded coil piece CC).

The first coil manufacturing unit 10_1 is constituted of, for example, two bending devices 30_1A and 30_1B, one welding device 201, and one removing device 40_1. The second and subsequent coil manufacturing units 10_2 . . . 10_N (in this example, 10_4) are each constituted of one bending device 30_2 . . . 30_N (30_4), one welding device 20_2 . . . 20_N (20_4), and one removing device 40_2 . . . 40_N (40_4).

In the coil manufacturing system 100, first, two U-shaped unit coil pieces C01 and C02 are prepared to form a region CR1 for one turn corresponding to the first turn of the helical structure body (equivalent to the region for one turn of a welded coil piece CC1 (welded region for one turn)), and are supplied to the first coil manufacturing unit 10_1. In the first coil manufacturing unit 101, the bending device 30_1A performs bending of the unit coil piece C01 (FIG. 13(B) (1)), and the bending device 30_1B performs bending of the unit coil piece C02 (FIG. 13(B) (2)). Then, the deformed unit coil pieces C01 and C02 are taken out by a robot or the like, which is not illustrated, and supplied to the welding device 20_1. In the welding device 201, as shown in FIG. 10, the first holding portion 11 and the second holding portion 12 hold the unit coil pieces C01 and C02, respectively, and one end face TS1 of the unit coil piece C01 and one end face TS2 of the unit coil piece C02 are connected (cold pressure-welded) to each other to form the welded coil piece CC1 (FIG. 13(B) (3)). At the time, the welding device 20_1 presses the end faces TS1 and TS2 against each other in each linear portion of the unit coil piece C01 and the unit coil piece C02 so as to make the length of the region for one turn (welding region for one turn) of the welded coil piece CC1 coincide with the length of the region CR for one turn of the coil 50.

More specifically, in this example, as shown in FIG. 10, the first holding portion 11 holds, for example, the longer side region LS2 of the unit coil piece C01 (the coil piece C1), and the second holding portion 12 holds the longer side region LS2 of the unit coil piece C02 (the coil piece C2), so that the TS1 and the TS2 are pressed against each other. In this example, the longer side region LS2 of the unit coil piece C01 is a longer side region inclined with respect to the reference plane SF0 where the shorter side SS and the longer side region LS1 are present. The longer side region LS2 of the unit coil piece C02 is a longer side region inclined with respect to the reference plane SF0 where the shorter side SS and the longer side region LS1 are present. Accordingly, the robot reverses the front and the back of one unit coil piece C0 in the state of being mounted on the bending device 30. Specifically, for example, a reversing step of reversing the front and the back of the unit coil piece C01 that is in the state of being mounted on the bending device 30_1A (state of being in a posture shown in FIG. 13(B) (1)) is performed so that a pressed surface (the surface in contact with the pressing portion) in the bending device 30_1A faces downward. The first holding portion 11 holds the unit coil piece C01 after reversal (FIG. 13(B) (2), FIG. 13(B) (3)). Meanwhile, the robot does not reverse the front and the back of the unit coil piece C02 that is in the state of being mounted on the bending device 30_1B (the front and the back unchanged from the time of deformation). The second holding portion 12 holds the unit coil piece C02 as it is (FIG. 13(B) (1), FIG. 13(B) (3)).

Therefore, the first holding portion 11 and the second holding portion 12 horizontally hold the longer side region LS2 of the unit coil piece C01 and the longer side region LS2 of the unit coil piece C02 to be newly welded, respectively. Hereinafter, this step is referred to as "leveling step of new regions to be welded". Then, the longer side regions LS2 are pressed against each other to form the welded coil piece CC1 (FIG. 13(B) (3)).

Then again, the robot or the like, which is not illustrated, takes out the welded coil piece CC1, and the burr 55 are removed in the first removing device 40_1 disposed downstream from the welding device 20_1 (FIG. 13(B) (4)). In the removing device 40_1, when the coil piece holding portion 41 holds the welded coil piece CC1, the removing portion 43 advances to remove the burr 55 projecting upward, for example. The removing portion 43 once retreats and descends, and then again advances to remove the burr 55 projecting downward (see FIG. 12).

Thus, the removing device 40 is capable of advancing to and retreating from the burr 55 generated by welding of the unit coil pieces C0. Whenever the welding device 20 performs welding of one portion, the removing device 40 advances to remove the burr 55.

Thus, the region CR for one turn (CR1) corresponding to the first turn of the helical structure body is formed. Then, a robot or the like, which is not illustrated, takes out the welded coil piece CC1, and supplies the welded coil piece CC1 to the welding device 20_2 of the second coil manufacturing unit 10_2 disposed downstream from the first removing device 40_1 (FIG. 13(B) (6)).

At the time, that is, at the time of supplying the welded coil piece CC1 to the welding device 20_2 of the second coil manufacturing unit 10_2, one end face TS1 of the welded coil piece CC1 (unwelded end face TS1 of the unit coil piece C02) and one end face TS2 of a new unit coil piece C03 are horizontally held by the first holding portion 11 and the second holding portion 12, respectively, and are subjected to cold pressure welding.

Then, in the bending device 30_2 of the second coil manufacturing unit 10_2, the unit coil piece C03 to be welded next is bent (FIG. 13(B) (5)), and the robot or the like, which is not illustrated, takes out the deformed unit coil piece C03. After the second coil manufacturing unit 10_2, the deformed unit coil pieces C0 are connected one piece at a time to the welded coil piece CC formed before. Hence one bending device 30 is provided for one unit.

In the second welding device 20_2, one end face TS1 of the welded coil piece CC1 (unwelded end face TS1 of the unit coil piece C02) and one end face TS2 of the unit coil piece C03 are cold pressure-welded in the linear portions as in the above-described case to form a welded coil piece CC2 (FIG. 13(B) (6)). Specifically, for example, the first holding portion 1 holds the longer side region LS1 of the welded coil piece CC1 (the unit coil piece C02) (while the front and the back of the welded coil piece CC1 at the time of pressing in the welding device 201 being maintained), and the second holding portion 12 holds the longer side region LS1 of the unit coil piece C03.

In other words, the leveling step for horizontally holding new regions to be welded (the longer side region LS1 of the welded coil piece CC1 (the unit coil piece C02) and the longer side region LS1 of the new unit coil piece C03) by the first holding portion 11 and the second holding portion 12 (the leveling step of new regions to be welded) is performed. In the leveling step, an inclining step (inclining step of the welded regions) is also performed at the same time. In the inclining step, the longer side region LS2 of the unit coil piece C01 and the longer side region LS2 of the unit coil piece C02 which are already welded are inclined from the horizontal state (FIG. 13(B) (4)) that is the state immediately after welding. Then, the end faces TS1 and TS2 of the longer side regions LS2 are pressed against each other (FIG. 13(B) (6)).

The longer side region LS1 of the welded coil piece CC1 (the unit coil piece C02) is a longer side region positioned substantially in the same plane (the reference plane SF0) as the shorter side SS. The longer side region LS1 of the unit coil piece C03 is a longer side region positioned substantially in the same plane (the reference plane SF0) as the shorter side SS.

For example, the robot performs the reversing step of reversing the front and the back of the unit coil piece C03 that is in the state of being mounted on the bending device 30_2 (state of being in a posture shown in FIG. 13(B) (1)) so that the pressed surface (the surface in contact with the pressing portion) in the bending device 30_2 faces downward. The robot then holds the unit coil piece C03 by the second holding portion 12 (FIG. 13(B) (5), FIG. 13(B) (6)) to form the welded coil piece CC2.

Then, the robot or the like, which is not illustrated, takes out the welded coil piece CC2, and the burr 55 are removed in the second removing device 40_2 disposed downstream from the welding device 10_20 (FIG. 13(B) (7)). As a result, the welded coil piece CC2 shown in FIG. 13(B) (7) is obtained. Then, the robot or the like takes out the welded coil piece CC2, and supplies the welded coil piece CC2 to the welding device 20_3 of the third coil manufacturing unit 10_3 (FIG. 13(B) (9)).

Then, in the bending device 30_3 of the third coil manufacturing unit 103, a unit coil piece C04 to be welded next is bent (FIG. 13(B) (8)), and the robot or the like, which is not illustrated, takes out the deformed unit coil piece C04.

In the third welding device 203, one end face TS1 of the welded coil piece CC2 (unwelded end face of the unit coil piece C03) and one end face TS2 of the unit coil piece C04 are cold pressure-welded in the linear portions as in the above-described case to form a welded coil piece CC3 (FIG. 13(B) (9)). Specifically, for example, the first holding portion 11 holds the longer side region LS2 of the welded coil piece CC2 (the unit coil piece C03) (while the front and the back of the welded coil piece CC2 at the time of pressing in the welding device 202 being maintained), and the second holding portion 12 holds the longer side region LS2 of the unit coil piece C04. In other words, the leveling step for horizontally holding new regions to be welded (the longer side region LS2 of the welded coil piece CC2 (the unit coil piece C03) and the longer side region LS2 of the new unit coil piece C04) by the first holding portion 11 and the second holding portion 12 (the leveling step of the new regions to be welded, and the inclining step of the welded regions (the longer side region LS1 of the unit coil piece C02 and the longer side region LS1 of the unit coil piece C03)) is performed, and the end faces TS1 and TS2 of the longer side regions are pressed against each other. The longer side region LS2 of the welded coil piece CC2 (the unit coil piece C03) is a longer side region inclined with respect to the reference plane SF0. The longer side region LS2 of the unit coil piece C04 is also a longer side region inclined with respect to the reference plane SF0.

For example, the robot holds the unit coil piece C04 with the second holding portion 12 in the state of being mounted on the bending device 303 (without the front and the back being reversed) so that the pressed surface (surface in contact with the pressing portion) in the bending device 30_3 faces upward. Thus, the welded coil piece CC3 is formed.

Then, the robot or the like, which is not illustrated, takes out the welded coil piece CC3, and the burr 55 are removed in the third removing device 40_3 disposed downstream from the welding device 20_3 (FIG. 13(B) (10)). Thus, the region CR for one turn (CR2) corresponding to the second turn of the helical structure body is formed. Then, the robot or the like takes out the welded coil piece CC3 and supplies the welded coil piece CC3 to the welding device 20_4 of the fourth coil manufacturing unit 10_4 (FIG. 13(B) (12)).

Meanwhile, in the bending device 30_4 of the fourth coil manufacturing unit 10_4, a unit coil piece C05 to be welded next is bent (FIG. 13(B) (11)), and the robot or the like, which is not illustrated, takes out the deformed unit coil piece C05.

In the fourth welding device 20_4, one end face TS1 of the welded coil piece CC3 (unwelded end face of the unit coil piece C04) and one end face TS2 of the unit coil piece C05 are cold pressure-welded in the linear portions as in the above-described case to form a welded coil piece CC4 (FIG. 13(B) (12)). Specifically, for example, the first holding portion 11 holds the longer side region LS1 of the welded coil piece CC3 (the unit coil piece C04) (while the front and the back of the welded coil piece CC3 at the time of pressing in the welding device 203 being maintained), and the second holding portion 12 holds the longer side region LS1 of the unit coil piece C05. Then, the leveling step for horizontally holding new regions to be welded (the longer side region LS1 of the welded coil piece CC3 (the unit coil piece C04) and the longer side region LS1 of the new unit coil piece C05) by the first holding portion 11 and the second holding portion 12 (the leveling step of the new regions to be welded, and the inclining step of the welded regions (the longer side region LS2 of the unit coil piece C03 and the longer side region LS2 of the unit coil piece C04)) is performed, and the end faces TS1 and TS2 of the longer side regions are pressed against each other. The longer side region LS1 of the unit coil piece C05 is a longer side region positioned on the reference plane SF0. The longer side region LS1 of the welded coil piece CC3 (the unit coil piece C04) is also positioned on the reference plane SF0.

For example, the robot also performs the reversing step of reversing the front and the back of the unit coil piece C05 from the state of being mounted on the bending device 30_4 so that the pressed surface (the surface in contact with the pressing portion) in the bending device 30_4 faces downward. The robot then holds the unit coil piece C05 by the second holding portion 12 (FIG. 13(B) (11), FIG. 13(B) 12)) to form the welded coil piece CC4.

Then, the robot or the like, which is not illustrated, takes out the welded coil piece CC4, and the burr 55 are removed in the fourth removing device 40_4 disposed downstream from the welding device 20_4 (FIG. 13(B) (13)). As a result, the welded coil piece CC4 shown in FIG. 13(B) (13) is obtained. Then, the robot or the like takes out the welded coil piece CC4. This process is repeated for the number of times corresponding to a prescribed number of turns N as necessary. As a result, a helical structure body having the regions CR for one turn corresponding to N turns is formed.

Thus, in the present embodiment, the bent coil pieces C1 and C2 are welded to each other at the end faces TS1 and TS2. Specifically, joining between the coil piece C1 and the coil piece C2 is made by either joining one side of the coil piece C1 having the bent portion B0 (for example, the longer side region LS2) and one side of the coil piece C2 having the bent portion B0 (for example, the longer side region LS2) (for example, FIG. 13(B) (1) to FIG. 13(B) (3)), or joining one side of the coil piece C1 without the bent portion B0 (for example, the longer side region LS1) and one side of the coil piece C2 without the bent portion B0 (for example, the longer side region LS1) (for example, FIG. 13(B) (5), FIG. 13(B) (6)).

As described in the foregoing, the bending step of the coil pieces C by the bending device 30 (FIG. 13(B) (1)) is performed, the reversing step of one coil piece C is performed (FIG. 13(B) (2)), the leveling step of new regions to be welded (the inclining step of welded regions) is performed (FIG. 13(B) (1) to FIG. 13(B) (3)), the welding step by the welding device 20 is performed (FIG. 13(B) (3)), and the removal step by the removing device 40 is performed (FIG. 13(B) (4)).

Then, the bending step of the coil pieces C by the bending device 30 is performed, the reversing step of one coil piece C is performed (FIG. 13(B) (5)), the leveling step of new regions to be welded is performed, the welding step by the welding device 20 is performed (FIG. 13(B) (6)), and the removal step by the removing device 40 is performed (FIG. 13(B) (7)).

Next, the bending step of the coil pieces C by the bending device 30 is performed (FIG. 13(B) (8)), the leveling step of new regions to be welded is performed, the welding step by the welding device 20 is performed (FIG. 13(B) (9)), and the removal step by the removing device 40 is performed (FIG. 13(B) (10)).

Then, the bending step of the coil pieces C by the bending device 30 is performed, the reversing step of one coil piece C is performed (FIG. 13(B) (11)), the leveling step of new regions to be welded is performed, the welding step by the welding device 20 is performed (FIG. 13(B) (12)), and the removal step by the removing device 40 is performed (FIG. 13(B) (13)).

By repeating a series of these steps, the helical structure body configured such that one longer side LS, out of facing longer sides LS of the region CR for one turn, is in the shape of inclining with respect to the other longer side LS, as shown in FIG. 13(B) (10) and FIG. 13(B) (13), is obtained.

In other words, in the coil manufacturing apparatus 10 of the present embodiment, the coil pieces are connected (additionally joined) in the state of expanding in an advancing direction of a spiral. After the coil pieces are formed into a helical structure body in a completed state, the helical structure body is integrally molded (for example, pressed or the like) so as to be elastically deformed and/or plastically deformed to cause compression in the advancing direction of a spiral. As a result, the coil 50 having spiral turns proximate to each other is formed.

In this example, the bending device 30 forms the bent portion B0 for the coil pieces C to be newly connected (whenever connecting is performed, immediately before connecting), and then the coil pieces C are supplied to the welding device 20. However, without being limited thereto, the bending device 30 may be configured to perform the bending step for the entire necessary number of the coil pieces C in advance. More specifically, in the case of forming a coil 50 using 20 coil pieces C1 in total, the bending device 30 may be configured to form the bent portion B0 for all of these 20 coil pieces C, and then, these coil pieces C are supplied one piece at a time to the welding device 20.

Even in such a case, whenever one welded portion CP is formed, the removing device 40 removes the burr 55 of the welded portion CP. With this configuration, the welded coil piece CC can be welded with a new coil piece C constantly in the state where the burr 55 of the welded portion CP is removed and interference of the first holding portion 11 and the second holding portion 12 with the welded coil piece CC is avoided.

Figure 14:
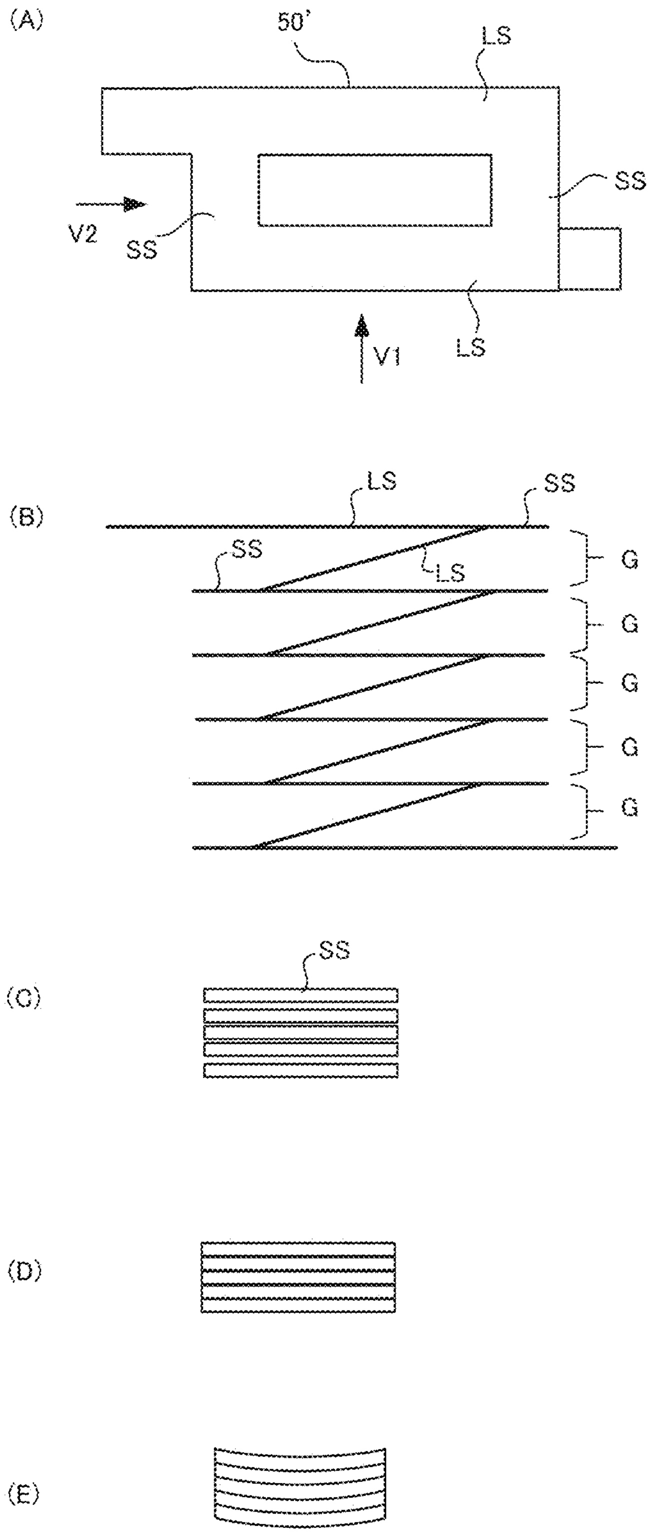

FIG. 14 shows an example of a completed helical structure body 50' discharged from a prescribed number of (N-th) coil manufacturing unit 10_N (the number of turns of the coil is different from that in the aforementioned embodiment). FIG. 14(A) is a front view (top view) of the helical structure body 50' as viewed from a spiral axis direction. FIG. 14(B) is a view (side view) of the helical structure body 50' before molding as viewed from an arrow V1 direction. FIGS. 14(C) to 14(E) are views (side views) of the helical structure body 50' after molding as viewed from an arrow V2 direction.

The completed helical structure body 50' is molded into a desired shape. More specifically, the coil pieces C of the present embodiment are bent by the bending device 30 before cold pressure welding. Hence, the coil pieces immediately after being discharged from the coil manufacturing apparatus 10 have a gap G between the regions CR for one turn as shown in FIG. 14(B).

Accordingly, molding is performed to narrow the gap G. Specifically, annealing is first performed to soften the helical structure body 50'. More specifically, the helical structure body 50' made of a metal material (for example, copper plate) is heated to an appropriate temperature (for example, a recrystallization temperature or more) in a furnace, held for a prescribed time, and is slowly cooled in the furnace. Thus, the metal material constituting the helical structure body 50' is changed into a structure without internal stress, and softens. In short, the helical structure body 50' is annealed so as to be susceptible to plastic deformation. It can also be said that annealing is performed to control the plasticity coefficient of the helical structure body 50' (to lower the elastic limit of the helical structure body 50'). Although (the metal material of) the helical structure body 50' softens after annealing, the shape (the gap G shown in FIG. 14(B)) is maintained unless external force is applied to the helical structure body 50'.

Then, the helical structure body 50' in the shape shown in FIG. 14(B) is soaked in a liquid insulating resin to integrally coat the helical structure body 50' with the insulating resin. The liquid insulating resin may be sprayed to the helical structure body 50' to integrally coat the helical structure body 50' with the insulating resin. Thus, the insulating resin enters into the gap G between the regions CR for one turn, and thereby the helical structure body 50' in which the periphery of the flat conductors are coated with the insulating resin from one end to the other end along the helical traveling direction is obtained.

Then, as shown in FIG. 14(C), the helical structure body 50' is compressed in the spiral axis direction so as to reduce the gap G, so that the helical structure body 50' is elastically deformed and/or plastically deformed in the helical traveling direction of the helical structure body. As a result, each spiral turn is made proximate to each other, and solidified. The annealed helical structure body 50' is easily elastically deformed and/or plastically deformed, so that the gap G between the regions CR for one turn is eliminated. The helical structure body 50' is fixed (solidified) in the state where the regions CR for one turn are in close contact with each other. Alternatively, the helical structure body 50' is fixed (solidified) in the state where the gap G between the regions CR for one turn is very small. Then, the regions CR for one turn in close contact with or proximate to each other are each insulated (FIG. 14(C) or 14(D)).

Furthermore, for example, in the case of the coil 50 that is attached to a stator core, the coil is molded to have a recessed or protruding shape in an axial center direction of the helical structure body (radial direction of the stator core), that is, a curved shape in which an inner peripheral end portion and an outer peripheral end portion are non-flush as shown in FIG. 14(E), depending on the shape of the stator core as necessary. Thus, the coil 50 integrally coated with the insulating resin is obtained.

In the conventional art, a long conducting wire corresponding to the length of a completed coil is coated with an insulating resin, and then the conducting wire is wound to form a helical structure. However, in that case, the insulating resin is extended to reduce a coating thickness in the vicinity of the outer periphery of a wound curved portion, which results in deterioration of withstand voltage. For example, also in the case of coating a helical structure body with an insulating resin before molding, the coating thickness of the insulating resin varies depending on pressing, which causes the same problem. In the present embodiment, the helical structure body 50' with the gap G between the regions CR for one turn is softened by annealing and integrally coated with an insulating resin. Then, the helical structure body 50' is compression molded to eliminate (or minimize) the gap G, and solidified. Therefore, it is possible to coat the periphery of the flat conductor substantially uniformly with the insulating resin from one end to the other end of the helical structure body 50' along the helical traveling direction, so that the uniformity of the film thickness of the insulating resin can be enhanced. It also becomes possible to bond the regions CR for one turn of the helical structure body 50' with the insulating resin.

The welding device 20 of the present embodiment uses coil pieces C having a length longer by the amount of compression (amount of contraction) caused by cold pressing (longer by a margin) on the basis of the length of the completed coil 50 to manufacture the coil 50 by additionally joining the coil pieces C in sequence while repeating compression (contraction) due to cold pressing.

Therefore, in cold pressure welding, cold pressure welding is performed while the distance in the strip longitudinal direction BL (see FIG. 2(B)) of the coil pieces C is measured. To measure the distance in the strip longitudinal direction BL, for example, a slip detection mechanism (not shown) may be provided in the first holding portion 11 and the second holding portion 12 (or the vicinity thereof). With this mechanism, the distance in the strip longitudinal direction BL can be measured by detecting a slip at the time of pressing the coil piece C (first coil piece C1) held by the first holding portion 11 and the coil piece C (second coil piece C2) held by the second holding portion 12. The distance in the strip longitudinal direction BL may be measured concurrently with cold pressure welding (in real time), or may be measured around the time of cold pressure welding (or before or after cold pressure welding). Thus, the precision of a coil size after completion can be improved.

As shown in FIGS. 2(A) and 2(E) to 2(G), the substantially right angle direction change portion TN of the coil piece C constitutes a corner portion of the coil 50. Therefore, with the welding device 20 of the present embodiment, it is possible to manufacture the coil 50 having inner peripheral and outer peripheral corner portions formed into a substantially right angle, by joining the coil pieces C configured to have the substantially right angle direction change portion TN by a punching process or the like. In the past, a long flat conductor has been wound to manufacture a coil made of a flat conductor. In the coil formed by winding, it is inevitable that at least the corner portion on the inner peripheral side of the coil is formed into a curved shape, which hinders enhancement in space factor, enhancement in heat dissipation performance, and the like.

However, according to the coil manufacturing apparatus 10 of the present embodiment, the coil pieces in the shape formed by the punching process can be welded with the shape as it is. Therefore, it is possible to manufacture the coil 50 having a right angle (substantially right angle) corner portion even on the coil inner peripheral side, having an enhanced space factor, and having enhanced heat dissipation performance by elimination of excessive space.

Particularly, the welded portion CP between the coil pieces C is provided in a linear portion other than the direction change portion TN (the corner portion). In short, pressure-welding is performed by using the linear portion of the coil pieces. As a result, the precision of the shape of the direction change portion TN can be enhanced. For example, the original shape of the corner portion, which is formed to be in a right angle (substantially right angle) through punching process, can be maintained.

Furthermore, the present embodiment can achieve mass-production of good-quality coils having an enhanced space factor and heat dissipation performance enhanced thereby. As a result, productivity can be enhanced.

A description will now be given of a coil manufacturing method of the present embodiment. The coil manufacturing method of the present embodiment can be carried out, for example, in the aforementioned coil manufacturing apparatus 10.

More specifically, the coil manufacturing method of the present embodiment is a coil manufacturing method for forming a helical structure body by joining a plurality of flat conductors (coil pieces C). The method includes: a bending step of bending each of the flat conductors C such that one portion, of each of the flat conductors C, extending along a helical traveling direction, is inclined with respect to the other portion; a welding step of forming a helical structure body by pressing end faces of one bent flat conductor C and another flat conductor C against each other along a strip longitudinal direction and joining the flat conductors through pressure-welding while reducing a distance in the strip longitudinal direction; and a removal step of removing a portion of the welded flat conductors.

Here, the bending step can be carried out in the aforementioned bending device 30. In the bending step, each of the coil pieces C is bent so that one side (for example, the longer side region LS2), out of two facing sides (for example, the longer side regions LS1 and LS2 constituting a longer side LS) scheduled to constitute a region CR for one turn, inclines with respect to the other side (for example, the longer side region LS1).

Then, a leveling step of new regions to be welded is performed. In the welding step, the end faces of the coil pieces C are pressure-welded to each other by the welding device 20.

The removal step can be carried out in the aforementioned removing device 40. In the removal step, burr 55 generated by pressing the plurality of flat conductors C are removed.

Since the detailed methods of the bending step and the removal step are as described before, the description thereof is omitted here. Hereinafter, a method of pressure welding in the welding device 20 is mainly described. Again, the coil manufacturing method of the present embodiment includes: bending each of the coil pieces C (the coil pieces C may be configured to be bent one piece at a time immediately before welding, or all the number of necessary coil pieces C may be configured to be bent); pressure-welding (welding) one coil piece C (C01) having a bent portion B0 formed therein to another coil piece C (C02) having a bent portion B0 formed therein; and removing burr 55 generated in a welded portion CP whenever the pressure-welded is performed (see FIG. 13).

However, in the following description, the method of pressure welding will mainly be described in detail, and the description of the bending step and removal step (step of deburring) performed before or after pressure welding will be omitted or simplified.

Figure 15:
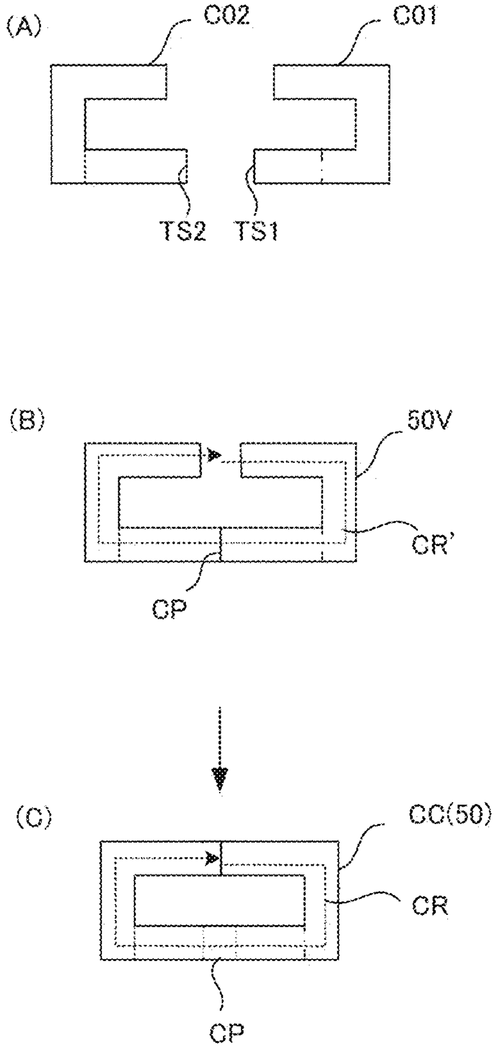
FIGS. 15(A) to 15(C) include top views illustrating a coil manufacturing method according to the present embodiment.

First, with reference to FIG. 15, the outline of pressure welding of the coil pieces C will be described. FIG. 15 are top views of the coil pieces C. The plurality of coil pieces C used in the present embodiment can form a helical structure body in a virtual state (hereinafter referred to as a "virtual helical structure body") by putting the end faces TS1 and TS2 in contact with each other. Specifically, the coil pieces C are set to be capable of forming a region for one turn (virtual region for one turn) CR' of a virtual helical structure body 50V shown in FIG. 15(B) by (performing the leveling step of new regions to be welded and) putting the end faces TS1 and TS2 of a unit coil piece C01 and a unit coil piece C02 in the strip longitudinal direction in contact with each other as shown in FIG. 15(A). Then, the virtual helical structure body 50V is set such that the length of the virtual region CR' for one turn in the helical traveling direction is longer by a pressing amount in pressure welding than a region CR for one turn of a helical structure body (coil) 50 in a completion state (FIG. 15(C)).

The welding device 20 presses the unit coil piece C01 and the unit coil piece C02 in the strip longitudinal direction to form a welded coil piece CC shown in FIG. 15(C), and makes the length of a welding region for one turn CR' of the welded coil piece CC coincide with the length of the region CR for one turn of the helical structure body (coil) 50. An end face TS0 and an end face TS1' on the opposite side of the end faces TS1 and TS2 in FIG. 15(A) are not pressure-welded to each other, but pressure-welded to the end faces of another coil piece C (or connected with terminals led to the outside).

More specifically, the coil manufacturing method of the present embodiment is as follows. A plurality of strip-shaped flat conductors (the coil pieces C) which can constitute a helical structure body 50 when they are continuously joined and which have a bent portion B formed therein is prepared. A preparation length L0 as a total distance in a strip longitudinal direction of the plurality of coil pieces C is set to be longer by a margin portion M than a completion length L in a spiral longitudinal direction of the helical structure body (coil) 50 scheduled to be completed. The end faces of the plurality of coil pieces C are pressed against each other along the strip longitudinal direction for cold pressure welding while the distance in the strip longitudinal direction is reduced. Whenever a welded portion CP is formed, deburring in the welded portion CP is performed. For all the plurality of coil pieces C, the margin portion M is set to a total reduction distance S that is the distance reduced by cold pressure welding. Thus, a helical structure body (coil) 50 is formed by joining the plurality of coil pieces C.

Figure 16:
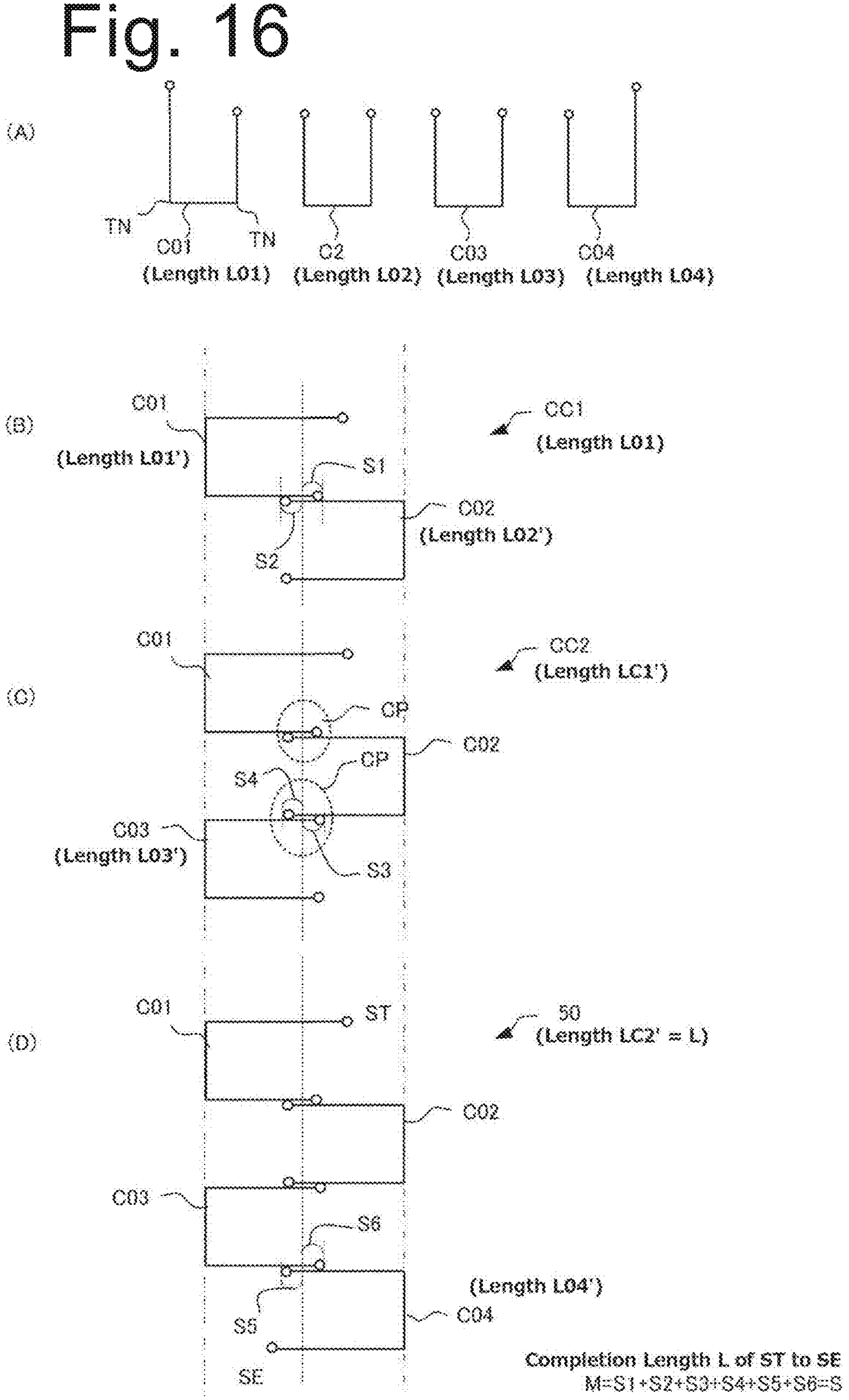
FIGS. 16(A) to 16(D) include schematic diagrams showing an example of the coil manufacturing method according to the present embodiment.

Specifically, a description will be given of an example in which four U-shaped (Japanese katakana "ko"-shaped) unit coil pieces C0 (C01 to C04) having two direction change portions TN are prepared, and these coil pieces are connected (continuously joined) to manufacture a coil (helical structure body) 50 having a spiral shape of two turns with reference to FIG. 16. FIG. 16(A) is a top view of the unit coil pieces C01 to C04. FIGS. 16(B) to 16(D) are developed views of the welded coil piece CC, with a broken line in the drawing showing an axial center (center of a welded portion CP) of the helical structure of the coil 50 scheduled to be completed. Two-dot chain lines on both the ends of the coil pieces in FIGS. 16(B) to 16(D) show finished end portions of a completed coil. In this example, the finished end portions are unchanged (the positions of the finished end portions do not move in a width direction of the drawings).

When the lengths of the unit coil pieces C01 to C04 in the strip longitudinal direction are set to L01 to L04, the preparation length L0 as a total distance in the strip longitudinal direction is L01+L02+L03+L04. The preparation length L0 is set to be longer by the margin portion M than a completion length L in the spiral longitudinal direction of the coil 50 (L0=L+M). When the unit coil piece C01 and the unit coil piece C02 are pressed against each other for cold pressure welding, the length L01 of the unit coil piece C01 in the strip longitudinal direction is compressed by the pressing to L01' (the amount of reduction (compression) is equal to the length of a distance S1 from the center of the welded portion CP (compression amount S1)), the length L02 of the unit coil piece C02 in the strip longitudinal direction is compressed to L2' (the amount of reduction (compression) is the length of a distance S2 from the center of the welded portion CP (compression amount S2). As a result, a welded coil piece CC1 (length LC1) is formed (FIG. 16(B)). Then, cold pressure welding is performed between the end face of the welded coil piece CC1 (end face of the unit coil piece C01 or C02 which is not welded) and the unit coil piece C03. Due to the pressing, the unit coil piece C03 is compressed to L03' (the amount of reduction (compression) is equal to the length of a distance S3 from the center of the welded portion CP (compression amount S3)). The welded coil piece CC1 is compressed to LC1' (the amount of reduction (compression) is the length of a distance S4 from the center of the welded portion CP (compression amount S2)). As a result, a welded coil piece CC2 is formed (FIG.

16C)). Cold pressure welding is further performed between the end faces of the welded coil piece CC2 (end face of the unit coil piece C01, C02 or C03 which is not welded) and the unit coil piece C04. Due to the pressing, the unit coil piece C04 is compressed to L04' (the amount of reduction (compression) is equal to the length of a distance S5 from the center of the welded portion CP (compression amount S5)). The welded coil piece CC2 is compressed to LC2' (the amount of reduction (compression) is equal to the length of a distance S6 from the center of the welded portion CP (compression amount S6)). As a result, the coil 50 (helical structure body) having the completion length (length from start point ST to end point ET) L in a spiral longitudinal direction is completed (FIG. 16(D)). The sum total of the amount of reduction of the coil pieces until the coil 50 is completed by joining the coil pieces (the unit coil pieces and/or the welded coil piece) (total reduction distance S=S1+S2+S3+S4+S5+S6) corresponds to the margin portion M.

The coil manufacturing method of the present embodiment will be described anew on the basis of the time series. First, the lengths L01 to L04 of the unit coil pieces are set on the basis of the length L of the coil 50 in the completion state so that the total reduction distance S equals to the margin portion M. At the same time, the compression amounts S1 to S6 by cold pressure welding are set.

With use of the coil pieces (each having the bent portion B0, which is not shown, formed therein) set in this way, the end faces of the unit coil piece C01 and the unit coil piece C02 are pressed against each other by the compression amounts S1 and S2 through cold pressure welding so as to be additionally joined, to form the welded coil piece CC1. The compression amounts S1 and S2 used in this case are recognized by detecting a slip at the time of pressing the unit coil piece C01 and the unit coil piece C02 to measure the distance between both the coil pieces in the strip longitudinal direction. The method of recognizing the compression amount is also used in the cold pressure welding described below.

After one welding region (for example, the vicinity of the end faces of the unit coil piece C01 and the unit coil piece C02 to be welded) is cold pressure-welded, the burr are generated in the welded portion due to pressing-in operation. Hence, after the cold pressure welding, the process of removing the burr is performed.

Next, the coil pieces (the welded coil piece CC1) are elastically deformed and/or plastically deformed in the helical traveling direction of a helical structure body scheduled to be completed, except for the vicinity of the end face to be cold pressure-welded (unwelded end face of the unit coil piece C01 or the unit coil piece C02). At the same time, cold pressure welding is performed between the welded coil piece CC1 and another coil pieces (the unit coil piece C03). At the time, a deformation amount of the elastic deformation and/or plastic deformation of the welded coil piece CC1 in the helical traveling direction is set to the amount for avoiding interference of the welded coil piece CC1 with the first holding portion 11 and the second holding portion 12 which hold coil pieces at the time of cold pressure welding. The deformation amount is the same in the following cold pressure welding.

Hereinafter, the coil pieces are similarly additionally joined. More specifically, the end face of the welded coil piece CC1 (end face of the unit coil piece C01 or C02 which is not welded)) and the unit coil piece C03 are additionally joined by pressing the end faces against each other by the compression amounts S3 and S4 through cold pressure welding. As a result, the welded coil piece CC2 is formed. Then, deburring in the welded region is performed, and the welded coil piece CC2 is elastically deformed and/or plastically deformed in the helical traveling direction of the helical structure body scheduled to be completed except for the vicinity of the end faces subjected to cold pressure welding. The end face of the welded coil piece CC2 and the unit coil piece C04 are pressed by the compression amounts S5 and S6 to be additionally joined through cold pressure welding. As a result, the helical structure body of a completion state is obtained.

Figure 17:
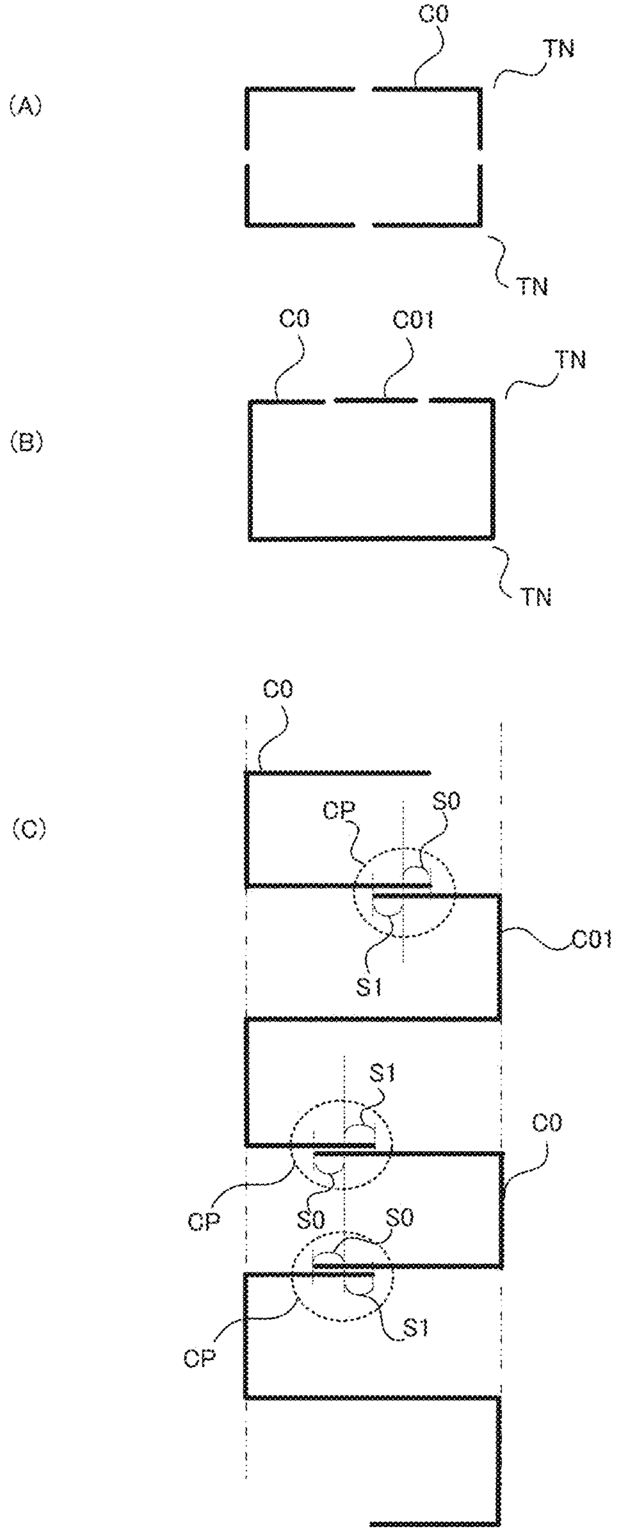
FIGS. 17(A) to 17(C) include schematic diagrams showing an example of the coil manufacturing method according to the present embodiment.

FIG. 17 shows connection examples when the coil pieces are different in shape.

FIG. 17(A) is a top view showing an example of connecting L-shaped coil pieces. In this example, four L-shaped unit coil pieces C0 are used to constitute a welded coil piece for one turn. Although illustration is omitted, also in this case, for the convenience of description, the coil pieces are set such that the preparation length L0 as a total distance in a strip longitudinal direction is longer by a margin portion M than a completion length L in a spiral longitudinal direction of the helical structure body (coil) scheduled to be completed. The margin portion M is set to a total reduction distance S that is the distance reduced by pressing when all the coil pieces are cold pressure-welded.

Not all the welded coil pieces for one turn need to be formed into an identical shape (L shape). Therefore, the welded coil piece for one turn may be formed by combining an L-shaped coil piece and an I-shaped (linear shaped) coil piece, or a U-shaped (Japanese katakana "ko"-shaped) coil piece.

FIG. 17(B) is a top view showing a connection example in which a C-shaped unit coil piece C0 and an I-shaped unit coil piece C01 are combined. Although illustration is omitted, also in this case, for the convenience of description, the coil pieces are set such that the preparation length L0 as a total distance in a strip longitudinal direction is longer by a margin portion M than a completion length L in a spiral longitudinal direction of the helical structure body (coil) scheduled to be completed. The margin portion M is set to a total reduction distance S that is the distance reduced by pressing when all the coil pieces are cold pressure-welded.

A coil connection piece for one turn may be formed by combining a substantially C-shaped unit coil piece having three direction change portions TN and an L-shaped unit coil piece having one direction change portion TN. Furthermore, the unit coil pieces forming the first and second turns of a helical structure body may be different in combination.

FIG. 17(C) is a development view in the case of forming a welded coil piece by combining a U-shaped (Japanese katakana "ko"-shaped) unit coil piece C0 having two direction change portions TN and a coil piece (O-shaped (Japanese katakana "ro"-shaped coil piece) C01 for one turn of a helical structure body scheduled to be completed. Two-dot chain lines on both the ends of the coil pieces in FIG. 17(C) show finished end portions of a completed coil. In this example, the finished end portions are unchanged (the positions of the finished end portions do not move in a width direction of the drawings).

The O-shaped coil piece C1 is cut in the welded portion. When cold pressure welding is performed between one end of the U-shaped unit coil piece C0 and one end of the O-shaped coil piece C01, the U-shaped unit coil piece C0 is compressed by the compression amount S0, and the O-shaped coil piece C1 is compressed by the compression amount S1. By repeating a series of these processes, the helical structure body can be formed. In FIG. 16 (when the U-shaped unit coil piece C0 having the same length are used), the welded portions CP are formed in substantially the same position (overlapped position) along the axial center of the helical structure in each turn of the helical structure as illustrated. In the case of FIG. 17(C), the welded portions CP are formed at positions displaced by a prescribed amount along the axial center (broken line) of the helical structure in each turn of the helical structure.

Figure 18:
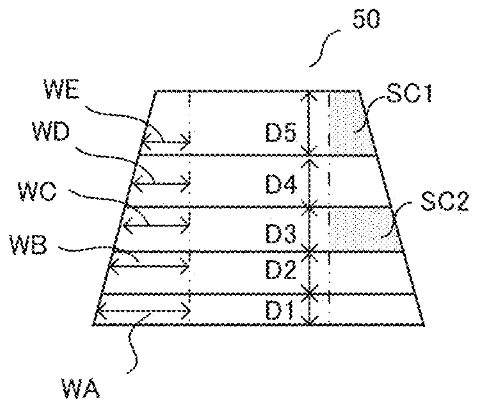
FIGS. 18(A) and 18(B) include schematic diagrams showing an example of the coil manufacturing method according to the present embodiment.
Figure 18:
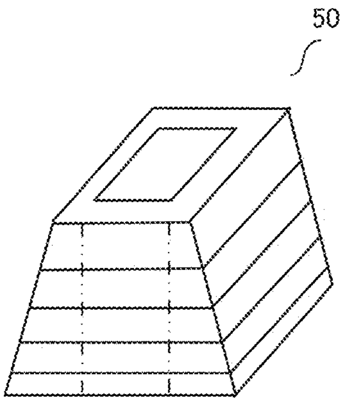

FIG. 18 shows a modified example of the coil 50. FIG. 18(A) is a side view corresponding to FIG. 14(C), and FIG. 18(B) is a perspective view of the coil 50.

The coil pieces C of the present embodiment may have widths WA, WB, WC, WD, and WE . . . which are different from each other (which are gradually larger (or smaller)) along the helical traveling direction. In this case, the coil pieces C have thicknesses D1 to D5 (spiral axial thicknesses) different according to the widths WA to WE so that the cross-sectional areas at any positions in the helical traveling direction (for example, cross-sectional areas SC1 and SC2 shown by a hatching in FIG. 18(A)) are equal to each other. The coil 50 has an outline of a truncated four-sided pyramid, as shown in this drawing.

Figure 19:
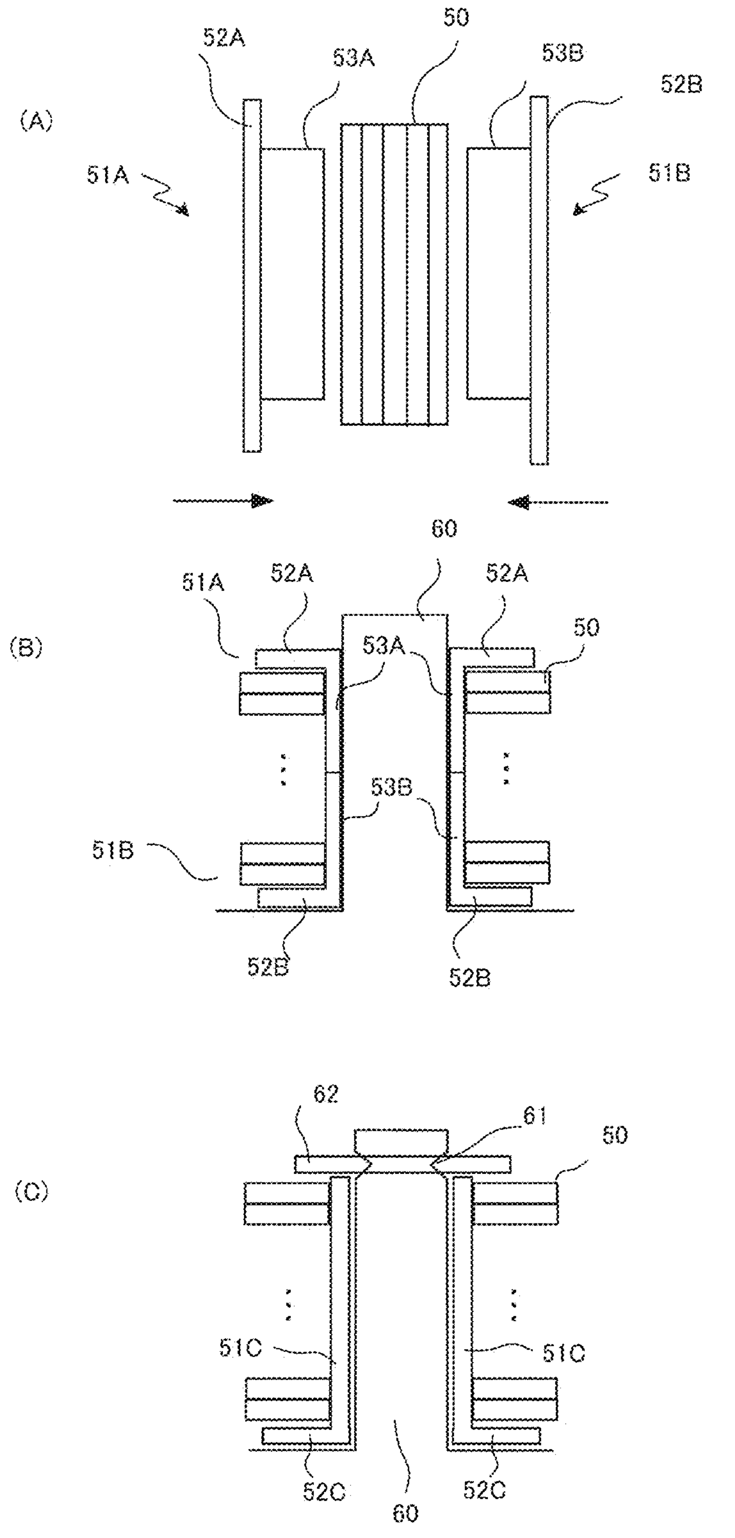

With reference to FIG. 19, an example of attaching the coil 50 of the present embodiment to a stator core will be described. FIG. 19(A) is a side view of the coil 50 and cassettes 51A and 51B when the axial direction of the spiral of the coil 50 is a width direction of the drawing. FIG. 19(B) is a top view of FIG. 19(A). FIG. 19(C) is a top view showing another example of attaching to the stator core 60.

The coil 50 of the present embodiment is molded along the outline of a stator core as shown in FIG. 14(E). After being molded, the coil 50 is integrally coated with the insulating resin, and is then installed to the stator core 60 as so-called post-installation.

Accordingly, for example, as shown in FIG. 19(A), the coil 50 is held between a set of cassettes 51A and 51B, and the cassettes 51A and 51B are attached to the stator core 60. Specifically, the cassette 51A has a supporter 53A that is inserted into the inner peripheral side of the helical structure of the coil 50 to support the coil 50, and a flange 52A provided on the side of one face in an axial center direction. Similarly, the cassette 51B has a supporter 53B and a flange 52B.

In this case, the supporter 53A of one cassette 51A is inserted in the inner periphery of the coil 50 from the side of the face on which the flange 52A is not formed, and the other cassette 51B is also placed so as to be overlapped. The cassettes 51A and 51B are engaged with each other in an engagement portion, which is not illustrated, provided in the supporters 53A and 53B. Then, the coil 50 with the cassettes is attached to the stator core 60 as shown in FIG. 19(B). Although illustration is omitted, the stator core 60 has a fixing portion to fix the coil 50 with the cassettes. The coil 50 with the cassettes is fit into (engaged with) the fixing unit and is thereby fixed.

Alternatively, as shown in FIG. 19(C), the coil 50 may be attached to one cassette 51C having a flange 52C only on the side of one face in an axial center direction of the helical structure, and be installed to the stator core 60. In that case, in order to prevent detachment of the coil 50 from the stator core 60 due to the centrifugal force at the time of operation (or generation of unnecessary movement (vibration)), the stator core 60 may be provided with a notch 61. After the coil 50 with the cassette is attached to the stator core 60, a stopper ring 62 covering the upper part of the coil 50 may be fit into the notch 61 of the stator core 60.

Thus, the coil 50 is attached to the stator core 60 to constitute a stator (not shown), and a known motor (not shown) is rotatably installed to the stator to manufacture a motor (not shown).

The above-described embodiment has been described taking examples of the cases where the coil pieces C are U-shaped. However, in the present embodiment, various deformations are possible as long as the shape of the coil 50 (helical structure body) shown in FIG. 14 is obtained. For example, when the coil piece C has any of other shapes (FIGS. 2(B), 2(D), 2(F), 2(G), 2 (H)), the configuration of the bending device 30 and the deformation position thereby, the configuration of the welding device 20 and the welding positions thereby, the configuration of the removing device 40 and the removal positions thereby, and the like, are properly changed, accordingly, so that the shape of the coil 50 (helical structure body) shown in FIG. 14 can be obtained.

The coil manufacturing apparatus 10 of the present embodiment has been described taking examples of the cases where the coil manufacturing apparatus 10 includes the bending device 30, the welding device 20, and the removing device 40. However, the coil manufacturing apparatus 10 according to the present invention may be configured to include the bending device 30 and the welding device 20, or the coil manufacturing apparatus 10 may be configured to include the welding device 20 and the removing device 40.

The coil manufacturing apparatus 10 (see FIG. 1) may also be configured such that the bending device 30, the welding device 20, and the removing device 40 may be housed in one housing unit (housing), the bending device 30 and the welding device 20 may be housed in one housing unit (housing), or the welding device 20 and the removing device 40 may be housed in one housing unit (housing).

The coil manufacturing system 100 (see FIG. 13) may be configured such that a plurality of the coil manufacturing units 10_N may be housed in one housing unit (housing).

The present invention is not limited to the configuration where the coil pieces C are deformed one piece at a time before welding. The present invention may be configured such that the bending device 30 deforms all the prescribed number (required number) of the coil pieces C which constitute the coil 50 in advance, and then the welding device 20 welds the deformed coil pieces C.

As described in the foregoing, the present invention is not limited to the embodiments disclosed, and may be configured in various embodiments. For example, the direction change portion TN of the coil piece may be in a curved shape.

One coil piece is not limited to one configured by a punching process of a copper plate. The coil piece may also be formed by parallel arrangement of a plurality of thin flat conductors (for example, flat conductors having a square shape in cross section in the strip longitudinal direction) in a strip transverse direction. The coil piece may also be formed partially from a coil piece formed by a punching process of a copper plate and partially from a coil piece formed by parallel arrangement of thin flat conductors.

The present invention is applicable in the case of manufacturing coils (flat coils, edgewise coils) using flat conductors, or the like.

REFERENCE SIGNS LIST

10 coil manufacturing apparatus (coil manufacturing unit)
11 first holding portion

12 second holding portion
13 driving portion
14 controller
15 biasing member
16 fixed member
17 movement regulator
18 pressing portion
20 welding device
30 bending device
31 supply portion
33 conveying portion
35 supporter
37 deforming portion
40 removing device
41 coil piece holding portion
43 removing portion
50 coil (helical structure body)
50V virtual helical structure body
51A, 51B, 51C cassette
52A, 52B, 52C flange
53A, 53B supporter
55 burr
60 stator core
100 coil manufacturing system
111 first upper holder
112 first lower holder
121 second upper holder
122 second lower holder
111T, 112T, 121T, 122T coil piece holding portion
161 protruding portion
162 protruding portion
163A regulating surface
311 turntable
331 rail member
333 driving portion
351 support table
353 retaining portion
371 pinching portion
373 biasing portion
373S inclined surface
411 coil piece holding portion
412 coil piece holding portion
C coil piece (flat conductor)
CC welded coil piece
CP welded portion
CR region for one turn
TN direction change portion
TS end face

The invention claimed is:

1. A coil manufacturing apparatus configured to form a helical structure body by joining a plurality of flat conductors, the apparatus comprising:

a welding device configured to form a welded product of the plurality of flat conductors; and a removing device configured to remove a portion of the welded product, wherein the welding device is a unit configured to press end faces of one flat conductor and another flat conductor among the plurality of flat conductors against each other along a strip longitudinal direction and to join the one flat conductor and the another flat conductor to form the welded product that is to be the helical structure body, the welded product that is taken out from the welding device is configured such that all one turn regions of the helical structure body are in a wider state than the helical structure body in a completed state, the removing device is a unit configured to have a coil piece holding portion and a cutting unit and to remove a burr generated by pressing of the plurality of flat conductors, the coil piece holding portion holds the welded product after being taken out from the welding device so as to maintain a shape of the welded product at least in a vicinity of a region where the burr is formed, and the cutting unit relatively moves with respect to the coil piece holding portion to remove the burr.

2. The coil manufacturing apparatus according to claim 1, wherein the coil piece holding portion has a first coil piece holding portion and a second coil piece holding portion, and each of the first and second coil piece holding portions holds the plurality of flat conductors constituting one of the regions for one turn.

3. A coil manufacturing method for forming a helical structure body by joining a plurality of flat conductors, the method comprising:

a welding step of forming a welded product, which is to be the helical structure, by pressing end faces of one and another one of the plurality of flat conductors against each other along a strip longitudinal direction and joining the one and the another one of the plurality of flat conductors; and a removing step of removing a burr generated in the welded product, wherein the welded product is configured by a welding device such that all one turn regions of the helical structure body are wider than the helical structure body in a completed state, and in the removing step, a coil piece holding portion of a removing device holds the welded product after the welded product has been taken out from the welding device and the burr is removed while the welded product is held so as to maintain a shape of the welded product at least in a vicinity of a region where the burr is formed.

4. The coil manufacturing method according to claim 3, further comprising a coating step of integrally coating the helical structure body with a coating.

5. A coil manufacturing system comprising a plurality of the coil manufacturing apparatuses according to claim 1.

* * * * *